United States Patent
Sullivan et al.

(10) Patent No.: US 12,503,306 B2
(45) Date of Patent: Dec. 23, 2025

(54) BOT POSITION SENSING

(71) Applicant: Symbotic, LLC, Wilmington, MA (US)

(72) Inventors: Robert Sullivan, Wilmington, MA (US); Michael Cyrulik, Hollis, NH (US); Stephen C. Toebes, Chelmsford, MA (US)

(73) Assignee: Symbotic LLC, Wilmington, MA (US)

( * ) Notice: Subject to any disclaimer, the term of this patent is extended or adjusted under 35 U.S.C. 154(b) by 0 days.

(21) Appl. No.: 18/427,228

(22) Filed: Jan. 30, 2024

(65) Prior Publication Data

US 2024/0166439 A1  May 23, 2024

Related U.S. Application Data

(63) Continuation of application No. 17/655,378, filed on Mar. 18, 2022, now Pat. No. 11,884,487, which is a continuation of application No. 16/917,555, filed on Jun. 30, 2020, now Pat. No. 11,279,557, which is a continuation of application No. 16/292,611, filed on Mar. 5, 2019, now Pat. No. 10,696,479, which is a continuation of application No. 16/107,068, filed on Aug. 21, 2018, now Pat. No. 10,221,014, which is a continuation of application No. 15/094,214, filed on Apr. 8, 2016, now Pat. No. 10,053,286, which is a
(Continued)

(51) Int. Cl.
*B07C 1/02* (2006.01)
*B65G 1/04* (2006.01)
*G05D 1/00* (2006.01)
*G05D 1/69* (2024.01)

(52) U.S. Cl.
CPC ......... *B65G 1/0492* (2013.01); *G05D 1/0272* (2013.01); *G05D 1/69* (2024.01)

(58) Field of Classification Search
CPC ....... B65G 1/0492; G05D 1/69; G05D 1/0272
See application file for complete search history.

(56) References Cited

U.S. PATENT DOCUMENTS

| | | |
|---|---|---|
| 1,146,283 A | 7/1915 | Rush |
| 2,497,887 A | 2/1950 | Meler |

(Continued)

FOREIGN PATENT DOCUMENTS

| | | |
|---|---|---|
| CN | 102317945 | 1/2012 |
| EP | 2436620 | 4/2012 |

(Continued)

OTHER PUBLICATIONS

U.S. Appl. No. 61/1159,773, filed Sep. 12, 2000, Goto.
International Search Report, International Application No. PCT/US2011/065234, dated May 18, 2012.

*Primary Examiner* — Adam M Alharbi
(74) *Attorney, Agent, or Firm* — Perman & Green, LLP

(57) ABSTRACT

A storage and retrieval system including a storage structure having storage shelves, each storage shelf having slats for supporting stored items where the slats are spaced apart from each other by a predetermined distance, an autonomous transport vehicle including at least one sensor configured to sense each of the slats and output a signal indicating when a slat is sensed, and a controller for verifying a location of the autonomous transport vehicle within the storage structure based on at least the output signal.

24 Claims, 17 Drawing Sheets

Related U.S. Application Data continuation of application No. 14/684,715, filed on Apr. 13, 2015, now Pat. No. 9,309,050, which is a continuation of application No. 13/327,035, filed on Dec. 15, 2011, now Pat. No. 9,008,884.

(60) Provisional application No. 61/423,206, filed on Dec. 15, 2010.

(56) References Cited

U.S. PATENT DOCUMENTS

| | | |
|---|---|---|
| 3,745,726 A | 7/1973 | Thom |
| 3,845,715 A | 11/1974 | Hochstraser |
| 4,319,689 A | 3/1982 | Clapp |
| 4,415,975 A | 11/1983 | Burt |
| 4,428,708 A | 1/1984 | Burt |
| 4,492,504 A * | 1/1985 | Hainsworth ............ B66F 9/07 414/280 |
| 4,777,416 A | 10/1988 | George, II et al. |
| 4,967,370 A | 10/1990 | Stern et al. |
| 5,220,263 A | 6/1993 | Onishi et al. |
| 5,323,098 A | 6/1994 | Hamaguchi et al. |
| 5,559,696 A | 9/1996 | Borenstein |
| 5,574,226 A | 11/1996 | Reuther et al. |
| 5,574,266 A | 11/1996 | Reuther et al. |
| 5,611,181 A | 3/1997 | Shreiner |
| 5,644,879 A | 7/1997 | Schre |
| 5,664,929 A | 9/1997 | Esaki et al. |
| 5,709,291 A | 1/1998 | Nishino et al. |
| 5,713,162 A | 2/1998 | Gallo et al. |
| 5,798,920 A | 8/1998 | Cruicus et al. |
| 5,798,930 A | 8/1998 | Van Oosten |
| 5,861,557 A | 1/1999 | Sahs |
| 5,974,348 A | 10/1999 | Rocks |
| 6,042,321 A | 3/2000 | Labell |
| 6,195,609 B1 | 2/2001 | Pilley et al. |
| 6,213,704 B1 | 4/2001 | White et al. |
| 6,295,922 B1 | 10/2001 | Salamone et al. |
| 6,397,990 B1 | 6/2002 | Brien et al. |
| 6,463,360 B1 | 10/2002 | Terada et al. |
| 6,496,755 B2 | 12/2002 | Wallach et al. |
| 6,564,516 B1 | 5/2003 | Svensson |
| 6,571,717 B2 | 6/2003 | Svensson |
| 6,597,143 B2 | 7/2003 | Song et al. |
| 6,663,334 B2 | 12/2003 | Warhurst et al. |
| 6,672,573 B2 | 1/2004 | Berton |
| 6,764,373 B1 | 7/2004 | Oswawa et al. |
| 6,836,701 B2 | 12/2004 | McKee |
| 6,859,682 B2 | 2/2005 | Naka et al. |
| 6,864,315 B1 | 3/2005 | Hakuta et al. |
| 6,912,751 B2 | 7/2005 | Steiger et al. |
| 6,922,632 B2 | 7/2005 | Foxlin |
| 7,039,501 B2 | 5/2006 | Freeman et al. |
| 7,051,808 B1 | 5/2006 | Vinegar et al. |
| 7,054,716 B2 | 5/2006 | McKee et al. |
| 7,066,291 B2 | 6/2006 | Martins et al. |
| 7,069,124 B1 | 6/2006 | Whittaker et al. |
| 7,133,746 B2 | 11/2006 | Abramson et al. |
| 7,204,669 B2 | 4/2007 | Cho et al. |
| 7,252,454 B2 | 8/2007 | Bradford et al. |
| 7,284,652 B2 | 10/2007 | Zeitler et al. |
| 7,332,890 B2 | 2/2008 | Cohen et al. |
| 7,376,487 B2 | 5/2008 | Kumhyr |
| 7,395,570 B2 | 7/2008 | Bradford et al. |
| 7,397,213 B2 | 7/2008 | Im et al. |
| 7,421,268 B2 | 9/2008 | Lee et al. |
| 7,456,596 B2 | 11/2008 | Goodall et al. |
| 7,460,462 B2 | 12/2008 | Mejia et al. |
| 7,499,155 B2 | 3/2009 | Cappelletti |
| 7,568,572 B2 | 8/2009 | Zeitler et al. |
| 7,575,406 B2 | 8/2009 | Hofmeister et al. |
| 7,615,957 B2 | 11/2009 | Kim et al. |
| 7,693,757 B2 | 4/2010 | Zimmerman |
| 7,706,917 B1 | 4/2010 | Chiappetta et al. |
| 7,725,253 B2 | 5/2010 | Foxlin |
| 7,729,801 B2 | 6/2010 | Abramson |
| 7,783,383 B2 | 8/2010 | Eliuk et al. |
| 7,848,881 B2 | 12/2010 | Tan et al. |
| 7,856,290 B2 | 12/2010 | Kumhyr |
| 7,873,469 B2 | 1/2011 | Dandrea et al. |
| 7,894,940 B2 | 2/2011 | Kumhyr |
| 7,944,368 B2 | 5/2011 | Carter et al. |
| 7,953,154 B2 | 5/2011 | Kim et al. |
| 7,959,395 B2 | 6/2011 | Hofmeister et al. |
| 7,963,384 B2 | 6/2011 | Lafontaine |
| 7,972,102 B2 | 7/2011 | Ward et al. |
| 7,988,398 B2 | 8/2011 | Hofmeister et al. |
| 7,991,505 B2 | 8/2011 | Lert, Jr. et al. |
| 8,015,760 B2 | 9/2011 | Kemeny |
| 8,046,103 B2 | 10/2011 | Abramson et al. |
| 8,046,160 B2 | 10/2011 | Carter et al. |
| 8,047,756 B2 | 11/2011 | Tuffs et al. |
| 8,255,082 B2 | 8/2012 | Asakawa et al. |
| 8,425,173 B2 | 4/2013 | Lert et al. |
| 8,628,289 B1 | 1/2014 | Benedict et al. |
| 8,740,538 B2 | 6/2014 | Lert et al. |
| 10,029,850 B2 | 7/2018 | Sulliven et al. |
| 2001/0054785 A1 | 12/2001 | Berton |
| 2002/0073787 A1 | 6/2002 | Eigen et al. |
| 2003/0069665 A1 | 4/2003 | Haag |
| 2003/0079877 A1 | 5/2003 | Wellington et al. |
| 2003/0080604 A1 | 5/2003 | Vinegar et al. |
| 2003/0098149 A1 | 5/2003 | Wellington et al. |
| 2003/0098605 A1 | 5/2003 | Vinegar et al. |
| 2003/0100451 A1 | 5/2003 | Messier et al. |
| 2003/0102124 A1 | 6/2003 | Vinegar et al. |
| 2003/0102125 A1 | 6/2003 | Wellington et al. |
| 2003/0102126 A1 | 6/2003 | Sumnu-Dindoruk et al. |
| 2003/0102130 A1 | 6/2003 | Vinegar et al. |
| 2003/0111223 A1 | 6/2003 | Rouffignac et al. |
| 2003/0116315 A1 | 6/2003 | Wellington et al. |
| 2003/0130136 A1 | 7/2003 | Rouffignac et al. |
| 2003/0131993 A1 | 7/2003 | Zhang et al. |
| 2003/0131994 A1 | 7/2003 | Vinegar et al. |
| 2003/0131995 A1 | 7/2003 | de Rouffignac et al. |
| 2003/0131996 A1 | 7/2003 | Vinegar et al. |
| 2003/0136558 A1 | 7/2003 | Wellington et al. |
| 2003/0136559 A1 | 7/2003 | Wellington et al. |
| 2003/0137181 A1 | 7/2003 | Wellington et al. |
| 2003/0141067 A1 | 7/2003 | Rouffignac et al. |
| 2003/0141068 A1 | 7/2003 | de Rouffignac et al. |
| 2003/0141608 A1 | 7/2003 | Rouffignac et al. |
| 2003/0142964 A1 | 7/2003 | Wellington et al. |
| 2003/0146002 A1 | 8/2003 | Vinegar et al. |
| 2003/0148894 A1 | 8/2003 | Vinegar et al. |
| 2003/0155111 A1 | 8/2003 | Vinegar et al. |
| 2003/0164239 A1 | 9/2003 | Wellington et al. |
| 2003/0173072 A1 | 9/2003 | Vinegar et al. |
| 2003/0173078 A1 | 9/2003 | Wellington et al. |
| 2003/0173080 A1 | 9/2003 | Berchenko et al. |
| 2003/0173081 A1 | 9/2003 | Berchenko et al. |
| 2003/0173082 A1 | 9/2003 | Vinegar et al. |
| 2003/0173085 A1 | 9/2003 | Vinegar et al. |
| 2003/0178191 A1 | 9/2003 | Maher et al. |
| 2003/0183390 A1 | 10/2003 | Veemstra et al. |
| 2003/0192691 A1 | 10/2003 | Vinegar et al. |
| 2003/0192693 A1 | 10/2003 | Wellington |
| 2003/0196788 A1 | 10/2003 | Vinegar et al. |
| 2003/0196789 A1 | 10/2003 | Wellington et al. |
| 2003/0196801 A1 | 10/2003 | Vinegar et al. |
| 2003/0196810 A1 | 10/2003 | Vinegar et al. |
| 2003/0201098 A1 | 10/2003 | Karanikas et al. |
| 2003/0205378 A1 | 11/2003 | Wellington et al. |
| 2003/0209348 A1 | 11/2003 | Ward et al. |
| 2004/0016065 A1 | 1/2004 | Steiger et al. |
| 2004/0020642 A1 | 2/2004 | Vinegar et al. |
| 2004/0024720 A1 | 2/2004 | Fairweather |
| 2004/0040715 A1 | 3/2004 | Wellington et al. |
| 2004/0074205 A1 | 4/2004 | Stache |
| 2004/0088081 A1 | 5/2004 | Song et al. |
| 2004/0136821 A1 | 7/2004 | Berger et al. |
| 2004/0143602 A1 | 7/2004 | Ruiz et al. |
| 2004/0255535 A1 | 12/2004 | Herren |
| 2005/0063089 A1 | 3/2005 | Starr et al. |

(56) References Cited

U.S. PATENT DOCUMENTS

| | | |
|---|---|---|
| 2005/0244228 A1 | 11/2005 | Bradford et al. |
| 2005/0262650 A1 | 12/2005 | Bradford et al. |
| 2006/0158043 A1 | 7/2006 | Brower et al. |
| 2007/0010940 A1 | 1/2007 | Tan et al. |
| 2007/0043600 A1 | 2/2007 | Solomon |
| 2007/0061041 A1 | 3/2007 | Zweig |
| 2007/0065259 A1 | 3/2007 | Talley |
| 2007/0114975 A1 | 5/2007 | Cohen et al. |
| 2007/0220815 A1 | 9/2007 | Kemeny |
| 2007/0267998 A1 | 11/2007 | Cohen et al. |
| 2008/0007203 A1 | 1/2008 | Cohen et al. |
| 2008/0044262 A1 | 2/2008 | Kim et al. |
| 2008/0063496 A1 | 3/2008 | Bufano et al. |
| 2008/0075357 A1 | 3/2008 | Yoon et al. |
| 2008/0080963 A1 | 4/2008 | Bufano et al. |
| 2008/0174268 A1 | 7/2008 | Koo et al. |
| 2008/0281717 A1 | 11/2008 | Kortelainen |
| 2008/0288104 A1 | 11/2008 | Shani |
| 2009/0007765 A1* | 1/2009 | Hunn ................ F41F 3/04 89/1.818 |
| 2009/0033316 A1 | 2/2009 | Hosek et al. |
| 2009/0074545 A1 | 3/2009 | Lert, Jr. |
| 2009/0085741 A1 | 4/2009 | Ravi et al. |
| 2009/0140887 A1 | 6/2009 | Breed et al. |
| 2009/0148259 A1 | 6/2009 | Shani |
| 2009/0224750 A1 | 9/2009 | Hosek et al. |
| 2009/0234500 A1 | 9/2009 | Tanaka |
| 2009/0284245 A1 | 11/2009 | Kirby et al. |
| 2009/0315501 A1 | 12/2009 | Li et al. |
| 2010/0076591 A1 | 3/2010 | Lert, Jr. |
| 2010/0118149 A1 | 5/2010 | Levin et al. |
| 2010/0121481 A1 | 5/2010 | Talley et al. |
| 2010/0126727 A1 | 5/2010 | Vinegar et al. |
| 2010/0131182 A1 | 5/2010 | Deegan et al. |
| 2010/0141483 A1* | 6/2010 | Thacher ............ G01S 13/931 340/989 |
| 2010/0145507 A1 | 6/2010 | Blust et al. |
| 2010/0183409 A1 | 7/2010 | Checketts et al. |
| 2010/0185353 A1 | 7/2010 | Barwick et al. |
| 2010/0188210 A1 | 7/2010 | Howard et al. |
| 2010/0208860 A1 | 8/2010 | Petrovich |
| 2010/0217565 A1 | 8/2010 | Wayne et al. |
| 2010/0277005 A1 | 11/2010 | Karalis et al. |
| 2010/0277121 A1 | 11/2010 | Hall et al. |
| 2010/0281807 A1 | 11/2010 | Bradford |
| 2010/0295943 A1 | 11/2010 | Cha et al. |
| 2010/0305854 A1 | 12/2010 | Kammel et al. |
| 2010/0308939 A1 | 12/2010 | Kurs |
| 2010/0316468 A1 | 12/2010 | Lert et al. |
| 2010/0316469 A1 | 12/2010 | Lert et al. |
| 2011/0038692 A1 | 2/2011 | Hofmeister et al. |
| 2011/0043373 A1 | 2/2011 | Best et al. |
| 2011/0060449 A1 | 3/2011 | Wurman et al. |
| 2011/0082583 A1 | 4/2011 | Kumhyr |
| 2011/0125323 A1 | 5/2011 | Gutmann et al. |
| 2011/0148364 A1 | 6/2011 | Ota |
| 2011/0182703 A1 | 7/2011 | Alan |
| 2011/0193031 A1 | 8/2011 | Kolditz et al. |
| 2011/0202175 A1 | 8/2011 | Romanov et al. |
| 2011/0208350 A1 | 8/2011 | Eliuk et al. |
| 2011/0254503 A1 | 10/2011 | Widmer et al. |
| 2011/0285349 A1 | 11/2011 | Widmer et al. |
| 2012/0041130 A1 | 2/2012 | Ye |
| 2012/0189409 A1 | 7/2012 | Toebes et al. |
| 2012/0189410 A1 | 7/2012 | Toebes et al. |
| 2012/0189411 A1 | 7/2012 | Yoshinaga |
| 2012/0197431 A1 | 8/2012 | Toebes et al. |
| 2013/0136468 A1 | 5/2013 | Shimizu et al. |
| 2013/0245810 A1 | 9/2013 | Sullivan et al. |
| 2020/0339351 A1 | 10/2020 | Sullivan et al. |
| 2021/0221617 A1 | 7/2021 | Yoshinaga |

FOREIGN PATENT DOCUMENTS

| | | |
|---|---|---|
| JP | 5389180 | 8/1978 |
| JP | 53089180 | 8/1978 |
| JP | 60183405 | 9/1985 |
| JP | 61094905 | 5/1986 |
| JP | 6194905 | 6/1986 |
| JP | 61271505 | 12/1986 |
| JP | 62140902 | 6/1987 |
| JP | 1179323 | 3/1999 |
| JP | 2000302214 | 10/2000 |
| JP | 2000344313 | 12/2000 |
| JP | 2001072208 | 3/2001 |
| JP | 2002167006 | 6/2002 |
| JP | 2004010294 | 1/2004 |
| JP | 2005138955 | 6/2005 |
| JP | 2005138957 | 6/2005 |
| JP | 2007210773 | 8/2007 |
| JP | 200844732 | 2/2008 |
| JP | 2008290807 | 4/2008 |
| JP | 2009179454 | 8/2009 |
| JP | 2009223943 | 10/2009 |
| JP | 2010108312 | 5/2010 |
| JP | 2011057334 | 3/2011 |
| JP | 2013023320 | 2/2013 |
| JP | 2013136451 | 7/2013 |
| JP | 2014503440 | 2/2014 |
| JP | 2017222519 | 12/2017 |
| TW | 20030069665 | 4/2003 |
| TW | 200823122 | 6/2008 |
| TW | 201000381 | 1/2010 |
| TW | 201102331 | 1/2011 |
| WO | 1999051455 | 10/1999 |
| WO | 2003013932 | 2/2003 |
| WO | 2005071597 | 1/2005 |
| WO | 2010118412 | 10/2010 |
| WO | 20100118412 | 10/2010 |
| WO | 2012083055 | 6/2012 |

* cited by examiner

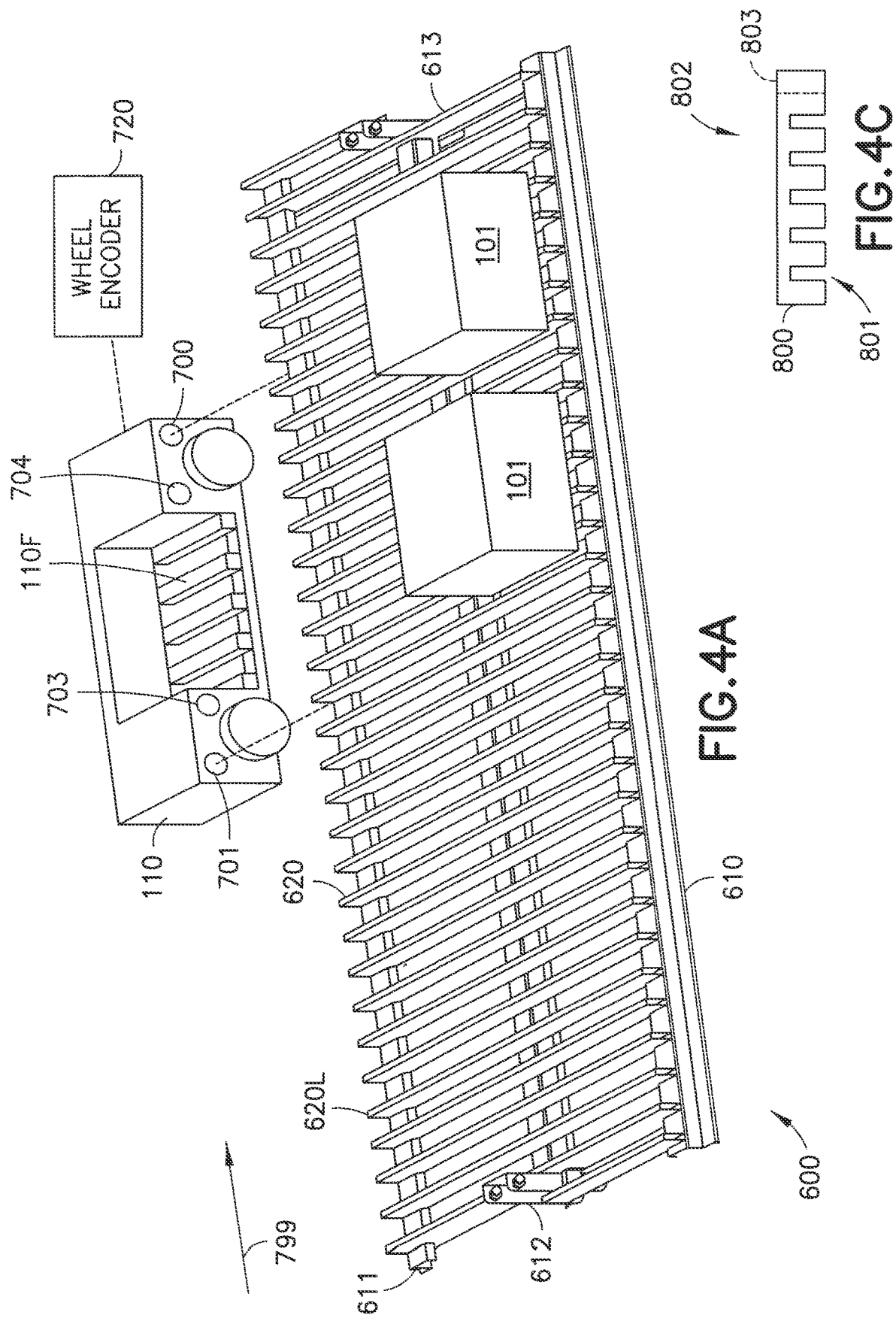

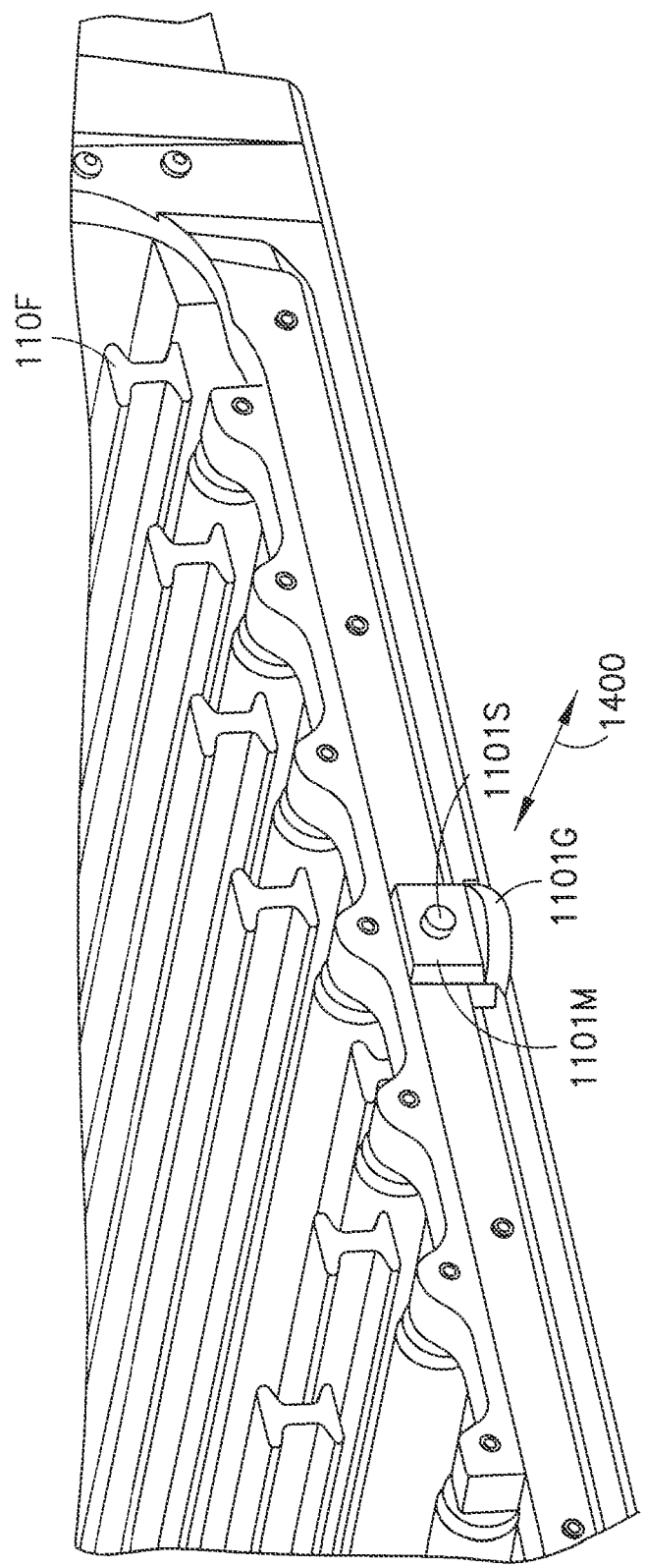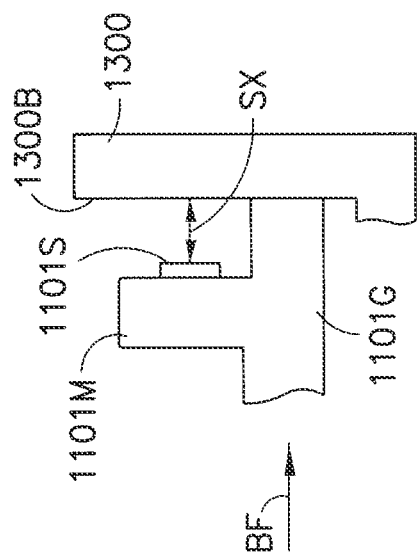
FIG. 14
FIG. 14A

BOT POSITION SENSING

CROSS-REFERENCE TO RELATED APPLICATIONS

This application is a continuation of U.S. patent application Ser. No. 17/655,378, filed Mar. 18, 2022, (Now U.S. Pat. No. 11,884,487, issued Jan. 30, 2024), which is a continuation U.S. patent application Ser. No. 16/917,555, filed Jun. 30, 2020, (Now U.S. Pat. No. 11,279,557, issued Mar. 22, 2022), which is a continuation of U.S. patent application Ser. No. 16/292,611, filed Mar. 5, 2019 (Now U.S. Pat. No. 10,696,479, issued Jun. 30, 2020), which is a continuation of U.S. patent application Ser. No. 16/107,068, filed Aug. 21, 2018 (Now U.S. Pat. No. 10,221,014, issued Mar. 5, 2019), which is a continuation of U.S. patent application Ser. No. 15/094,214, filed on Apr. 8, 2016 (Now U.S. Pat. No. 10,053,286, issued Aug. 21, 2018), which is a continuation of U.S. patent application Ser. No. 14/684,715, filed on Apr. 13, 2015 (Now U.S. Pat. No. 9,309,050, issued Apr. 12, 2016), which is a continuation of U.S. patent application Ser. No. 13/327,035, filed on Dec. 15, 2011 (Now U.S. Pat. No. 9,008,884, issued Apr. 14, 2015), which is a non-provisional of and claims the benefit of U.S. Provisional Patent Application No. 61/423,206 filed on Dec. 15, 2010, the disclosures of which are incorporated herein by reference in their entireties.

BACKGROUND

1. Field

The embodiments generally relate to storage and retrieval systems and, more particularly, to autonomous transports of the storage and retrieval systems.

2. Brief Description of Related Developments

Warehouses for storing case units may generally comprise a series of storage racks that are accessible by transport devices such as, for example, fork lifts, carts and elevators that are movable within aisles between or along the storage racks or by other lifting and transporting devices. These transport devices may be automated or manually driven. Generally the items transported to/from and stored on the storage racks are contained in carriers, for example storage containers such as trays, totes or shipping cases, or on pallets.

When transporting the cases to and from the storage racks with automated transports it would be advantageous to be able to locate the automated transports relative to a case holding area for accurately picking and placing cases to and from the case holding area.

BRIEF DESCRIPTION OF THE DRAWINGS

The foregoing aspects and other features of the disclosed embodiments are explained in the following description, taken in connection with the accompanying drawings, wherein:

FIGS. 4A and 4B illustrate storage shelves and an exemplary autonomous transport vehicle in accordance with the embodiments;

FIG. 4C is a schematic illustration of an assembly jig in accordance with the embodiments;

FIG. 14 is a schematic illustration of a portion of the transport vehicle of FIG. 11 in accordance with the embodiments;

FIG. 14A is a schematic illustration of a portion of a positioning system in accordance with the embodiments;

DETAILED DESCRIPTION OF THE EXEMPLARY EMBODIMENT(S)

Figure 1:
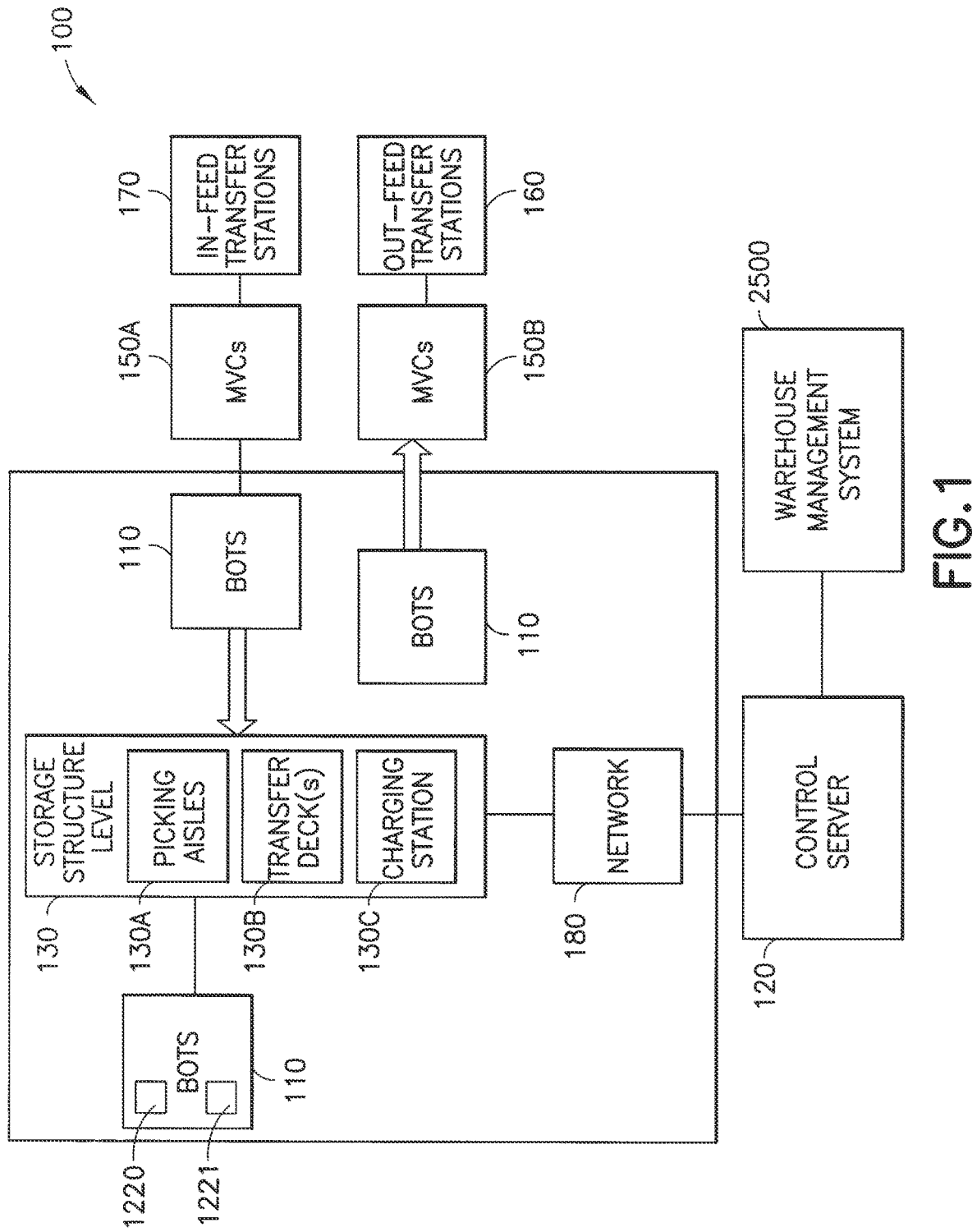
FIG. 1 schematically illustrates an exemplary storage and retrieval system in accordance with the embodiments.

FIG. 1 schematically illustrates an exemplary storage and retrieval system in accordance with the embodiments. Although the disclosed embodiments will be described with reference to the embodiments shown in the drawings, it should be understood that the disclosed embodiments can be embodied in many alternate forms. In addition, any suitable size, shape or type of elements or materials could be used.

In accordance with the embodiments the storage and retrieval system 100 may operate in a retail distribution center or warehouse to, for example, fulfill orders received from retail stores for case units (where case units as used herein means items not stored in trays, on totes or on pallets, e.g. uncontained or items stored in trays, totes or on pallets). It is noted that the case units may include cases of items (e.g. cases of soup cans, boxes of cereal, etc.) or individual items that are adapted to be taken off of or placed on a pallet. In accordance with the embodiments, shipping cases or case units (e.g. cartons, barrels, boxes, crates, jugs, totes, pallets or any other suitable device for holding case units) may have variable sizes and may be used to hold items in shipping and may be configured so they are capable of being palletized for shipping. It is noted that when, for example, bundles or pallets of case units arrive at the storage and retrieval system the content of each pallet may be uniform (e.g. each pallet holds a predetermined number of the same item—one pallet holds soup and another pallet holds cereal) and as pallets leave the storage and retrieval system the pallets may contain any suitable number and combination of different items (e.g. each pallet may hold different types of items—a pallet holds a combination of soup and cereal). It should be understood that the embodiments of the storage and retrieval system described herein may be applied to any environment in which case units are stored and retrieved.

The storage and retrieval system 100 may be configured for installation in, for example, existing warehouse structures or adapted to new warehouse structures. In the embodiments, the storage and retrieval system may include in-feed and out-feed transfer stations 170, 160, multilevel vertical conveyors 150A, 150B, a storage structure 130, and a number of autonomous transport vehicles or robots 110 (referred to herein as "bots"). The storage and retrieval system may also include robot or bot transfer stations (as described in, for example, U.S. patent application Ser. No. 12/757,220, entitled "STORAGE AND RETRIEVAL SYSTEM" and filed on Apr. 9, 2010, the disclosure of which is incorporated by reference herein in its entirety) that may provide an indirect interface between the bots 110 and the multilevel vertical conveyor 150A, 150B. The in-feed transfer stations 170 and out-feed transfer stations 160 may operate together with their respective multilevel vertical conveyors 150A, 150B for bi-directionally transferring case units to and from one or more levels of the storage structure 130. It is noted that while the multilevel vertical conveyors are described herein as being dedicated inbound or in-feed conveyors 150A and outbound or out-feed conveyors 150B, each of the conveyors 150A, 150B may be used for both inbound and outbound transfer of case units/items from the storage and retrieval system. The multilevel vertical conveyors may be any suitable lifting devices for transporting case units between levels of the storage and retrieval system. It is noted that while multilevel vertical conveyors are described herein in other aspects the conveyors may be any suitable conveyors or transfer/picking devices having any suitable transport path orientation. Some non-limiting suitable examples of multilevel vertical conveyors can be found in, for example, U.S. patent application Ser. No. 13/327,088, entitled "MULTILEVEL VERTICAL CONVEYOR PLATFORM GUIDES" filed on Dec. 15, 2011, and U.S. patent application Ser. No. 12/757,354, entitled "LIFT INTERFACE FOR STORAGE AND RETRIEVAL SYSTEMS" and filed on Apr. 9, 2010 (the disclosures of which are incorporated by reference herein in their entireties) and U.S. patent application Ser. No. 12/757,220, entitled "STORAGE AND RETRIEVAL SYSTEM," (previously incorporated by reference). For example, the multilevel vertical conveyors may have any suitable number of support shelves for transporting the case units to a predetermined level of the storage and retrieval system. The support shelves may have slatted supports configured to allow fingers of the bots 110 or in-feed/out-feed transfer stations 170, 160 to pass between the slats for transferring case units to and from the conveyor. It is noted that in the embodiments transfer of case units between the bots and the multilevel vertical conveyors may occur in any suitable manner.

As may be realized, the storage and retrieval system 100 may include multiple in-feed and out-feed multilevel vertical conveyors 150A, 150B that are accessible by, for example, bots 110 on each level of the storage and retrieval system 100 so that one or more case unit(s) can be transferred from a multilevel vertical conveyor 150A, 150B to each storage space on a respective level and from each storage space to any one of the multilevel vertical conveyors 150A, 150B on a respective level. The bots 110 may be configured to transfer the case units between the storage spaces and the multilevel vertical conveyors with one pick (e.g. substantially directly between the storage spaces and the multilevel vertical conveyors). By way of further example, the designated bot 110 picks the case unit(s) from a shelf of a multilevel vertical conveyor, transports the case unit(s) to a predetermined storage area of the storage structure 130 and places the case unit(s) in the predetermined storage area (and vice versa).

The bots 110 may be configured to place case units, such as the above described retail merchandise, into picking stock in the one or more levels of the storage structure 130 and then selectively retrieve ordered items for shipping the ordered items to, for example, a store or other suitable location. In the embodiments, the bots 110 may interface in any suitable manner with the multilevel vertical conveyors 150A, 150B such as through, for example, extension of a transfer arm or effector 110A (FIG. 9) of the bot (which may have fingers 110F (FIGS. 4A and 9)) for interfacing with slatted support shelves of the multi-level vertical conveyors) relative to a frame of the bot. Suitable examples of bots are described in U.S. patent application Ser. No. 12/757,312, entitled "AUTONOMOUS TRANSPORTS FOR STORAGE AND RETRIEVAL SYSTEMS" and filed on Apr. 9, 2010, U.S. Provisional Patent Application entitled "BOT PAYLOAD ALIGNMENT AND SENSING" (Ser. No. 61/423,220) and filed on Dec. 15, 2010 (now U.S. patent application Ser. No. 13/327,040 filed on Dec. 15, 2011), U.S. Provisional Patent Application entitled "AUTOMATED BOT WITH TRANSFER ARM" (Ser. No. 61/423,365) and filed on Dec. 15, 2010 (now U.S. patent application Ser. No. 13/326,952 filed on Dec. 15, 2011), and U.S. Provisional Patent Application entitled "AUTOMATED BOT TRANSFER ARM DRIVE SYSTEM" (Ser. No. 61/423,388) and filed on Dec. 15, 2010 (now U.S. patent application Ser. No. 13/326,993 filed on Dec. 15, 2011), the disclosures of which are incorporated by reference herein in their entireties.

Figure 12:
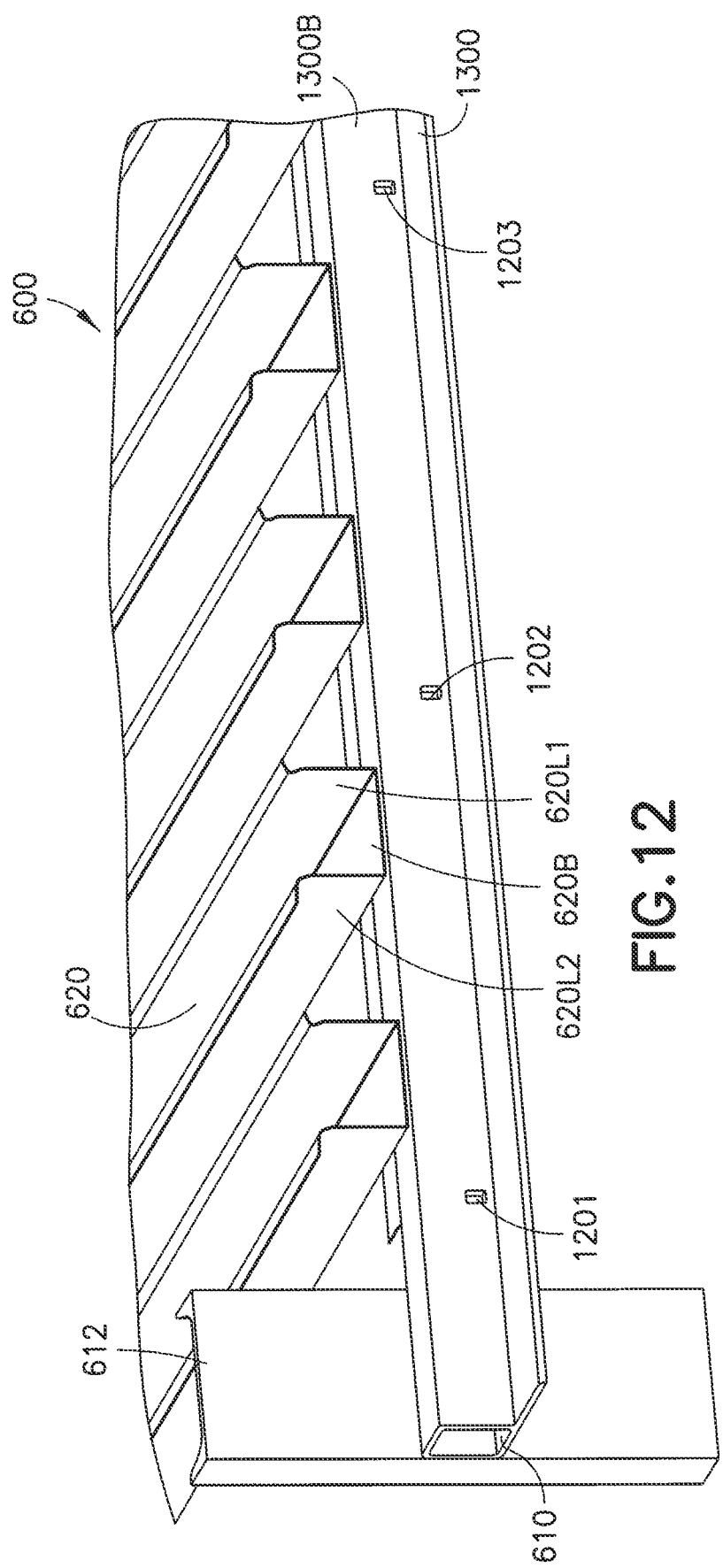
FIG. 12 is a schematic illustration of a portion of a storage shelf in accordance with the embodiments.
Figure 13:
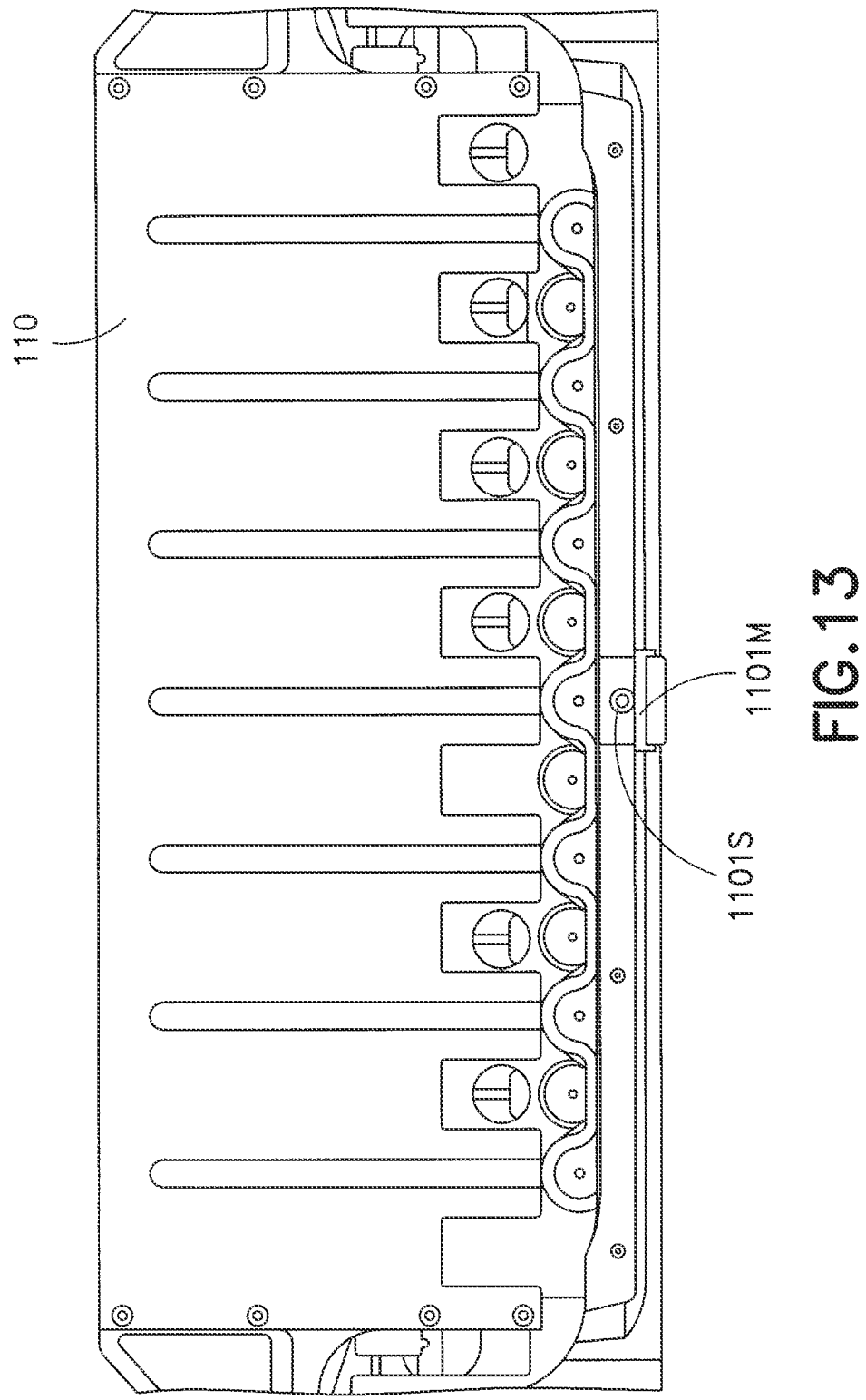
FIG. 13 is a schematic illustration of a portion of the transport vehicle of FIG. 11 in accordance with the embodiments.

The storage structure 130 may include multiple levels of storage rack modules where each level includes an array of storage spaces (arrayed on the multiple levels and in multiple rows on each level), picking aisles 130A formed between the rows of storage spaces, and transfer decks 130B. It is noted that the bots 110 may be configured to traverse the transfer decks 130B while being mechanically unconstrained and may be configured to traverse the picking aisles 130A while being mechanically constrained by, for example, rails or other guiding features located in the picking aisles 130A. Any bot 110 traveling on a level of the storage structure may enter any one of the picking aisles 130A located on that level which may allow for a variance between a frame of the bot 110 and targets or positioning determining features 1201-1203 (FIG. 12) to exist. It is also noted that each level may also include respective bot transfer stations that provide an indirect interface between the bots and the multilevel vertical conveyors. In the embodiments, the picking aisles 130A and transfer decks 130B may be arranged for allowing the bots 110 to traverse respective levels of the storage structure 130 for placing case units into picking stock and to retrieve the ordered case units. As may be realized, the storage and retrieval system may be configured to allow random accessibility to the storage spaces. For example, all storage spaces in the storage structure 130 may be treated substantially equally when determining which storage spaces are to be used when picking and placing case units from/to the storage structure 130 such that any storage space of sufficient size can be used to store items. The storage structure 130 of the embodiments may also be arranged such that there is no vertical or horizontal array partitioning of the storage structure. For example, each multilevel vertical conveyor 150A, 150B is common to all storage spaces (e.g. the array of storage spaces) in the storage structure 130 such that any bot 110 can access each storage space and any multilevel vertical conveyor 150A, 150B can receive case units from any storage space on any level so that the multiple levels in the array of storage spaces substantially act as a single level (e.g. no vertical partitioning). The multilevel vertical conveyors 150A, 150B can also receive case units from any storage space on any level of the storage structure 130 (e.g. no horizontal partitioning). It is noted that the storage and retrieval system may be configured so that each multilevel vertical conveyor serves a predetermined area of the array of storage spaces.

The storage structure 130 may also include charging stations 130C for replenishing, for example, a battery pack of the bots 110. In the embodiments, the charging stations 130C may be located at, for example, transfer areas 295 (FIG. 2) of the transfer deck 130B so that the bots 110 can substantially simultaneously transfer items, for example, to and from a multilevel vertical conveyor 150A, 150B while being charged. The bots 110 and other suitable features of the storage and retrieval system 100 may be controlled by, for example, one or more central system control computers (e.g. control server) 120 through, for example, any suitable network 180. The network 180 may be a wired network, a wireless network or a combination of a wireless and wired network using any suitable type and/or number of communication protocols. It is noted that, in the embodiments, the system control server 120 may be configured to manage and coordinate the overall operation of the storage and retrieval system 100 and interface with, for example, a warehouse management system 125, which in turn manages the warehouse facility as a whole. The control server 120 may be substantially similar to that described in, for example, U.S. patent application Ser. No. 12/757,337, entitled "CONTROL SYSTEM FOR STORAGE AND RETRIEVAL SYSTEMS" and filed on Apr. 9, 2010 (the disclosure of which is incorporated by reference herein in its entirety).

Figure 2:
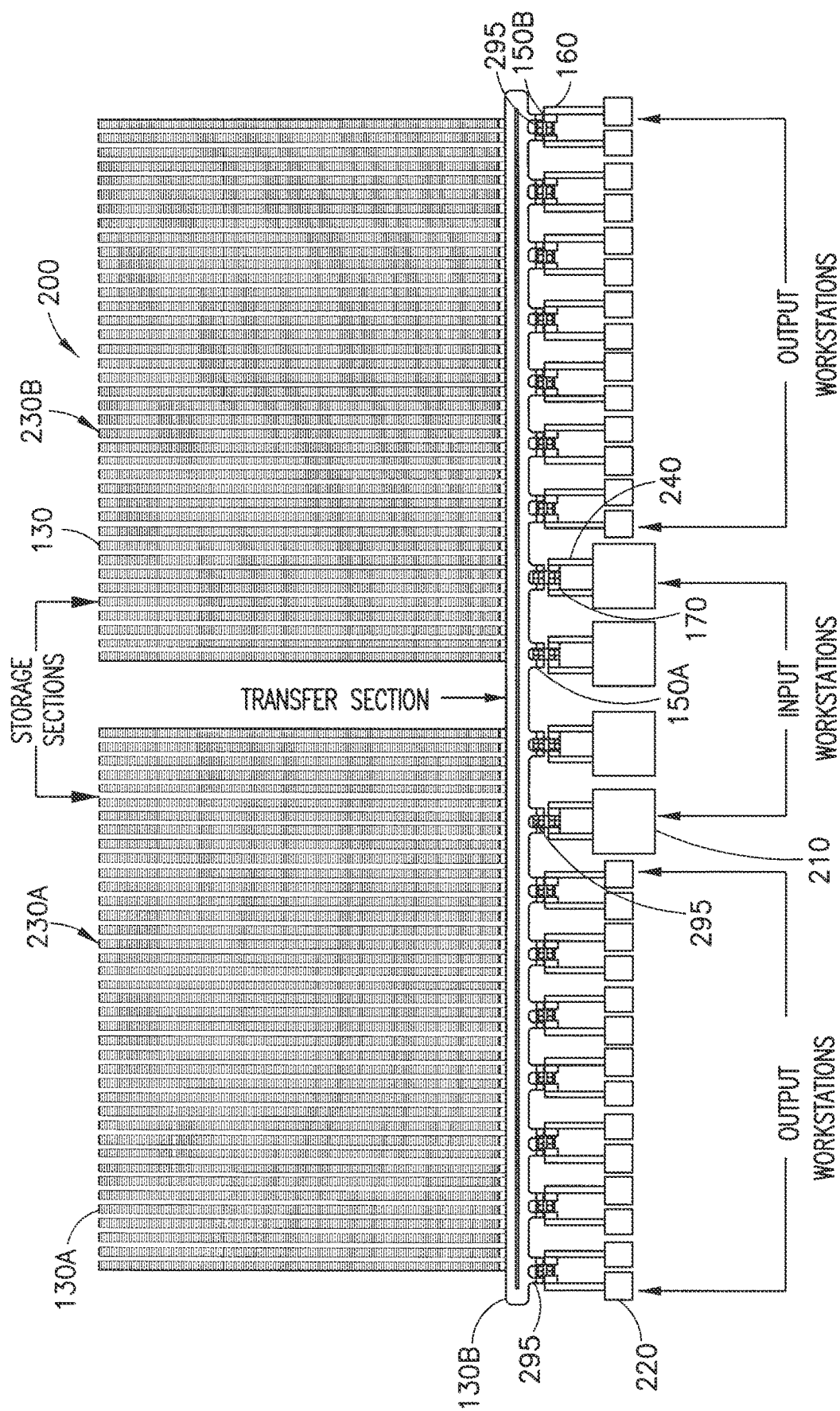
FIG. 2 illustrates a schematic plan view of an exemplary storage and retrieval system in accordance with the embodiments.
Figure 3:
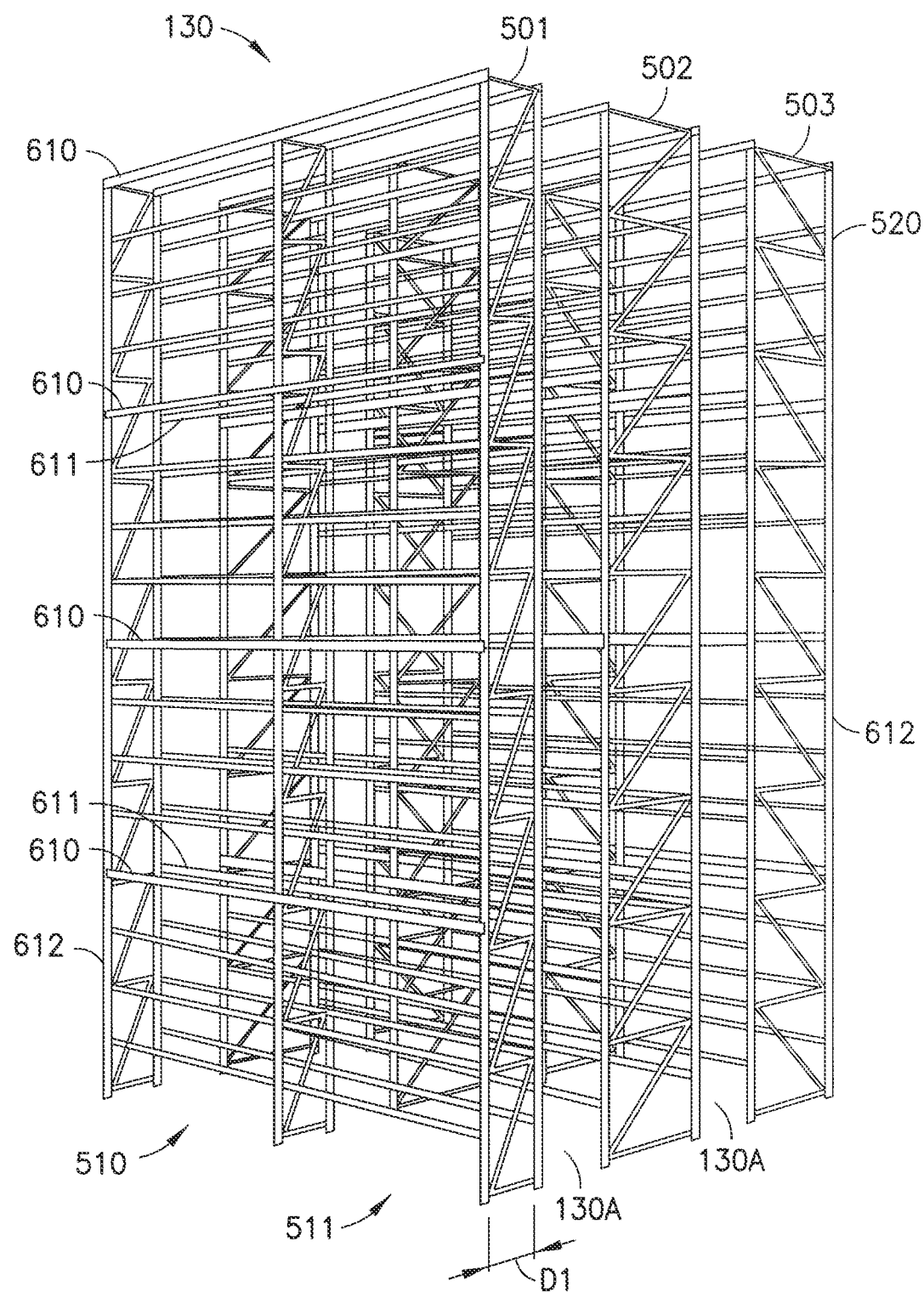
FIG. 3 illustrates a structural portion of a storage and retrieval system in accordance with the embodiments.

Referring also to FIG. 2, an exemplary configuration of the storage and retrieval system 100 is shown. Other suitable exemplary configurations of storage and retrieval systems can be found in, for example, U.S. patent application Ser. No. 12/757,381, entitled "STORAGE AND RETRIEVAL SYSTEM" and filed on Apr. 9, 2010, and U.S. Provisional Patent Application entitled "Warehousing Scalable Storage Structure" with (Ser. No. 61/423,340) and filed on Dec. 15, 2010 (now U.S. patent application Ser. No. 13/326,674 filed on Dec. 15, 2011), the disclosures of which are incorporated by reference herein in their entireties. It should be understood that the storage and retrieval system may have any suitable configuration. As can be seen in FIG. 2, the storage and retrieval system 200 is configured, for exemplary purposes only, as a single-ended picking structure in which only one side of the system 200 has a transfer section or deck 130B. The single-ended picking structure may be used in, for example, a building or other structure having loading docks disposed only on one side of the building. In this example, the storage and retrieval system 200 includes transfer deck(s) 130B and picking aisles 130A that allow bots 110 to traverse an entirety of a level of the storage structure 130 on which that bot 110 is located for transporting items between any suitable storage locations/picking aisles 130A and any suitable multilevel vertical conveyors 150A, 150B. The multilevel vertical conveyors 150A, 150B provide transport of case units into the storage and retrieval system 200 through input workstations 210 and provide output of case units from the storage and retrieval system 200 through output workstations 220. In the embodiments, the storage and retrieval system 200 includes a first and second storage section 230A, 230B located side by side so that the picking aisles of each section are substantially parallel with each other and facing the same direction (e.g. towards transfer deck 130B). It should be understood that in the embodiments the storage and retrieval system may have any suitable number of storage sections arranged relative to each other in any suitable configuration.

Figure 8:
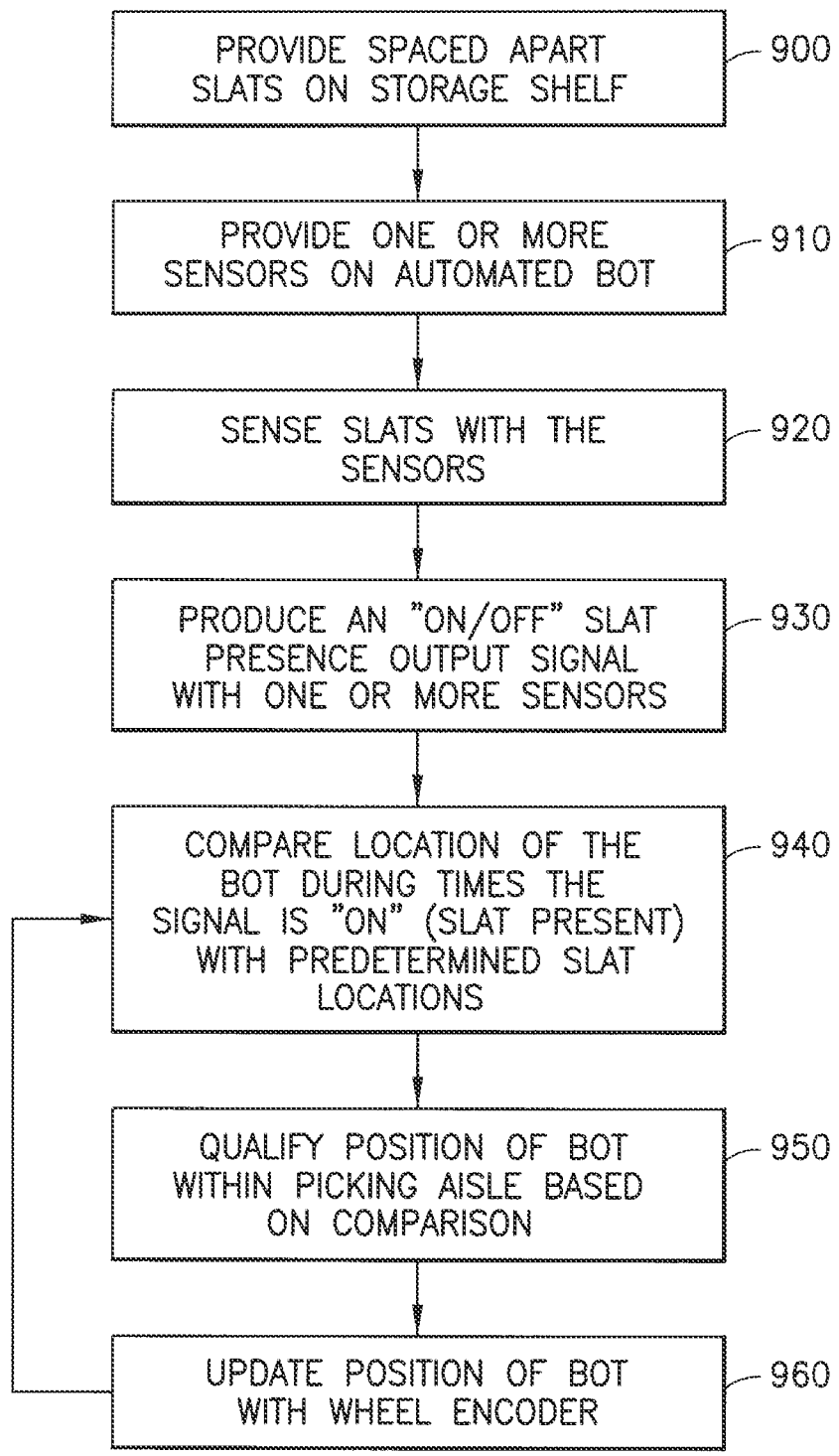
FIG. 8 is a flow diagram in accordance with the embodiments.

Referring to FIGS. 1, 3, 4A and 4B, each of the storage bays 510, 511 of the storage structure 130 may hold the picking stock on storage shelves 600 that are separated by aisle spaces 130A. In the embodiments the storage bays 510, 511 and storage shelves 600 may be substantially similar to those described in, for example, U.S. patent application Ser. No. 12/757,220, entitled "STORAGE AND RETRIEVAL SYSTEM," and U.S. patent application Ser. No. 12/757,381, entitled "STORAGE AND RETRIEVAL SYSTEM" (both of which being previously incorporated by reference). For example, one or more support legs 620L1, 620L2 may be provided on the storage shelves 600 so that the support legs extend from, for example, the horizontal supports 610, 611, 613 (which are supported by vertical supports 612) (FIG. 8, Block 900). The support legs 620L1, 620L2 may be integrally formed with the storage rack structure in any suitable manner. For example, the support legs 620L1, 620L2 may have any suitable configuration and may be part of, for example, a substantially U-shaped channel 620 such that the support legs 620L1, 620L2 are connected to each other through channel portion 620B. The channel portion 620B may provide an attachment point between the channel 620 and one or more horizontal supports 610, 611, 613. It should be understood that each support leg 620L1, 620L2 may also be configured to individually mount to the horizontal supports 610, 611, 613.

As may be realized, Referring also to FIG. 4C, the support legs 620L1, 620L2 may be installed on the horizontal supports 610, 611, 613 with an installation jig 802. The installation jig 802 may include a body 800 having a first set of grooves 801 configured so that the support legs 620L1, 620L2, generally referred to as slats 620L, fit into the grooves for accurately locating the slats 620L on the horizontal supports 610, 611, 613 within a predetermined tolerance. The installation jig 802 may include a second groove 803, substantially orthogonal to the first set of grooves 801. The second groove may be configured to accept a vertical support 612 for locating the installation jig 802 relative to the storage rack structure. It should be understood that the installation jig 802 may be located relative to the storage rack structure in any suitable manner for installing the slats 620L. The slats 620L may be affixed to the storage structure in any suitable manner such as by, for example, snaps, fasteners, welds, chemical bonding agents and the like. It should be understood that the slats 620L may be installed on the storage rack structure in any suitable manner using any suitable alignment tools.

Figure 4B:
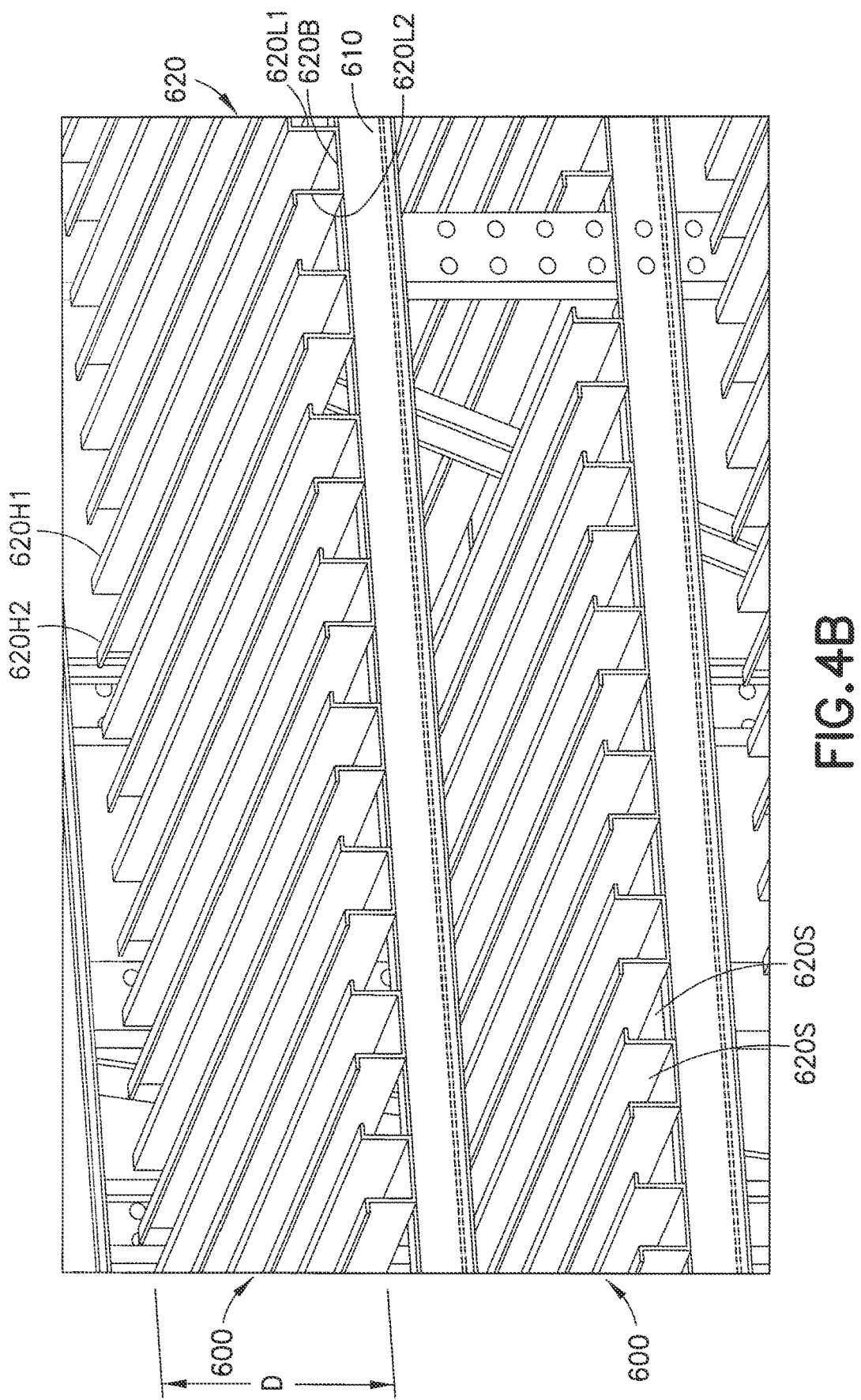

In the embodiments, each support leg 620L1, 620L2 includes a bent portion 620H1, 620H2 having a suitable surface area configured to support case units stored on the shelves 600. The bent portions 620H1, 620H2 may be configured to substantially prevent deformation of the case units stored on the shelves. It should be understood that the leg portions 620H1, 620H2 may have a suitable thickness or have any other suitable shape and/or configuration for supporting case units stored on the shelves. As can be seen in FIGS. 4A and 4B, the slats 620L or channels 620 may form a slatted or corrugated shelf structure where spaces 620S between, for example, the support legs 620L1, 620L2 allow for arms or fingers 110F of the bots 110 to reach into the shelving for transferring case units to and from the shelves as well as allowing the bot 110 to track its position within the storage rack structure. The slats 620L may be mounted to the storage shelf 600 such that the distance 620S (e.g. space between slats) places the slats 620L at known increments 130A for bot position location during picking and placing case units to the storage shelves 600. In one example, the spacing 620S between the slats 620L can be arranged to provide an incremental bot positioning system (e.g. the spacing 620S is substantially the same between all of the slats 620L where the bot location is tracked from a base or reference point such as an end of the picking aisle 130A). In another example, the spacing 620S between the support legs 620L1, 620L2 can be arranged to provide an absolute bot positioning system (e.g. the spacing 620S follows a predetermined pattern so that each space when detected by the bot provides a unique identifiable location of the bot within the picking aisle) while still allowing the fingers 110F of the bot 110 to be inserted between the slats 620L for picking and placing case units from the storage shelves 600. In the embodiments, substantially the same absolute encoder slat pattern may be used in each of the picking aisles while in other alternate embodiments each of the picking aisles may have a unique absolute encoder slat pattern so as to identify the aisle as well as the bot location within the aisle. It should be understood that in the embodiments, the spacing between the slats 620L on the shelves 600 may be any suitable spacing to provide any suitable measurement scale for determining the location of the bot such as, for example, a combination of incremental and absolute positioning scales. The position of the bot may also be determined using a "map" or "fingerprint" of the cases on the storage shelves as will be described in greater detail below. It is also noted that transfer of case units to and from the multilevel vertical conveyors 150A, 150B (whether the transfer is made directly or indirectly by the bot 110) may occur in a substantially similar manner to that described above with respect to storage shelves 600.

Figure 5:
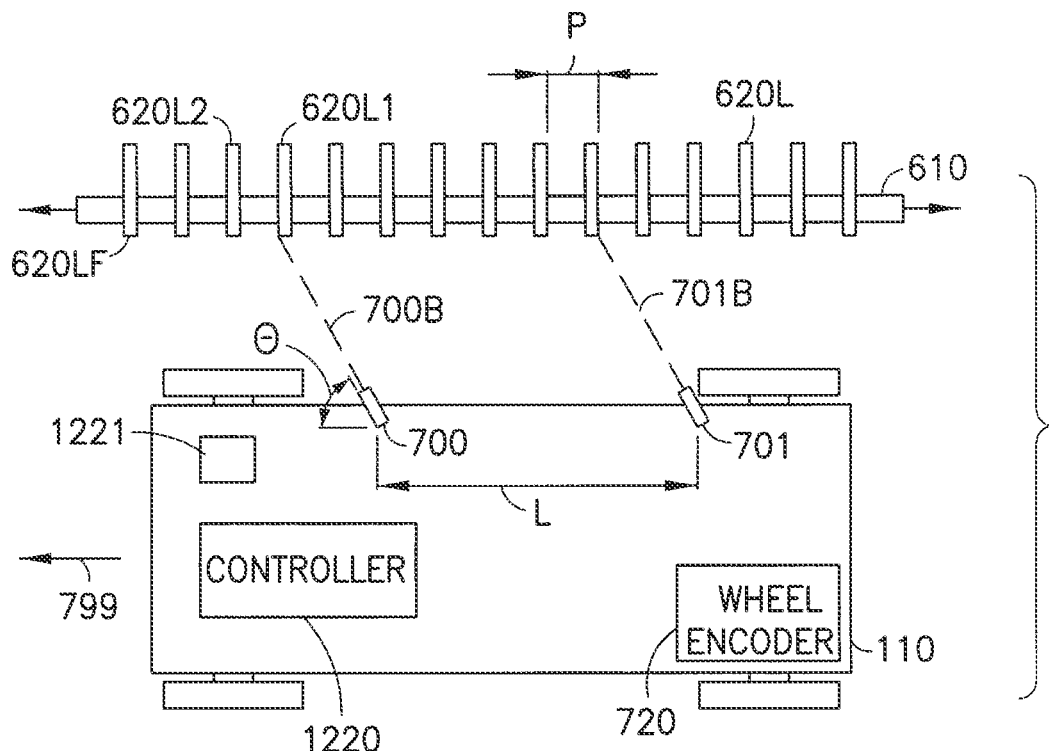
FIG. 5 is a schematic illustration of an autonomous transport vehicle and a portion of a storage shelf in accordance with the embodiments.

Referring now to FIGS. 4A and 5, any suitable number of sensors for detecting or sensing the slats 620L may be provided on the bot 110 (FIG. 8, Block 910). In the embodiments the bot 110 includes two sensors 700, 701 for exemplary purposes only. In the embodiments the sensors 700, 701 are described as beam sensors including an emitter and a receiver. The emitter and receiver of each sensor 700, 701 may be housed in a unitary sensor casing or separate sensor casings of the respective sensor 700, 701. It should be understood that the sensors 700, 701 may be any suitable types of sensors including, but not limited to, beam sensors and proximity sensors such as magnetic sensors, capacitance sensors, inductance sensors and the like. The sensor 700 may be located towards the front of the bot 110 and the sensor 701 may be located towards the rear of the bot 110. It should be realized that the terms "front" and "rear" are relative terms and used herein for exemplary purposes only as the bot 110 may be configured to travel down the picking aisle 130A in any direction such that the front and rear of the bot, relative to the direction of bot travel, may be reversed. It should be understood that one or more sensors may be located at any suitable positions on the bot such as for example, along any suitable length of any suitable side of the bot 110. The sensors 700, 701 may be mounted to the bot 110 in any suitable manner such as to the chassis or any other portion of the bot 110 structure.

The sensors 700, 701 may be mounted to the bot 110 for detecting or otherwise sensing the slats 620L to provide, for example, an incremental (or absolute) and discrete position encoder (FIG. 8, Block 920) for determining a location of the bot within, for example, a picking aisle 130A or any other suitable location within the storage and retrieval system 100. The sensors 700, 701 may be mounted at any suitable angle θ (shown exaggerated in FIGS. 5, 7 and 9) relative to, for example, the bot chassis and/or the face 620LF of the slats 620L for generating a signal when a respective slat 620L is sensed. It is noted that the angle θ may allow, for example, a beam emitted from the sensor to be reflected off of, for example, the slats 620L and be received by a receiver of the sensor as will be described below. As may be realized, the emitter of the beam sensor may be configured such that the emitter is angled relative to the sensor housing so that the housing can be mounted to the bot substantially parallel and/or perpendicular to one or more structural features of the bot. As may also be realized where the sensors used are proximity sensors, the sensors may not be angled as the slats are detected through, for exemplary purposes only, changes in capacitance, inductance or magnetic fields as will be described in greater detail below. It is noted that the sensors may have any suitable arrangement/configuration relative to the slats for detecting the slats and determining a position of the bot. As a non-limiting example only, the back surface of the shelf may have an anti-reflective property that allows the sensors to be placed so that the sensor beam of a reflective type sensor is substantially parallel to a longitudinal axis of the slats (e.g. not at an angle to the slats).

Figure 6:
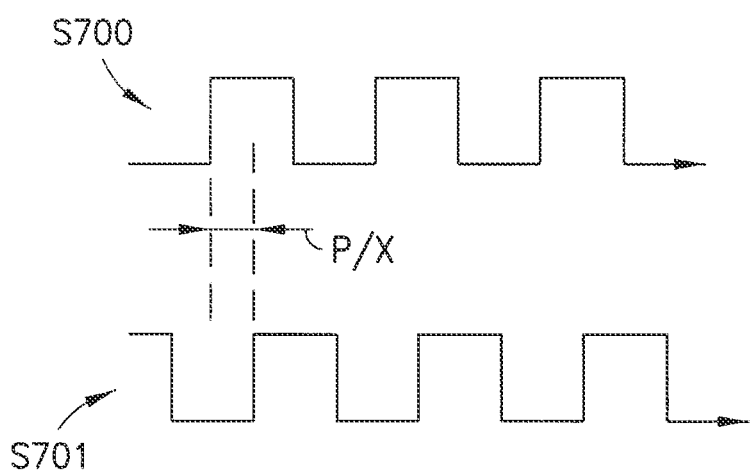
FIG. 6 is a schematic illustration of sensor output signals in accordance with the embodiments.
Figure 7:
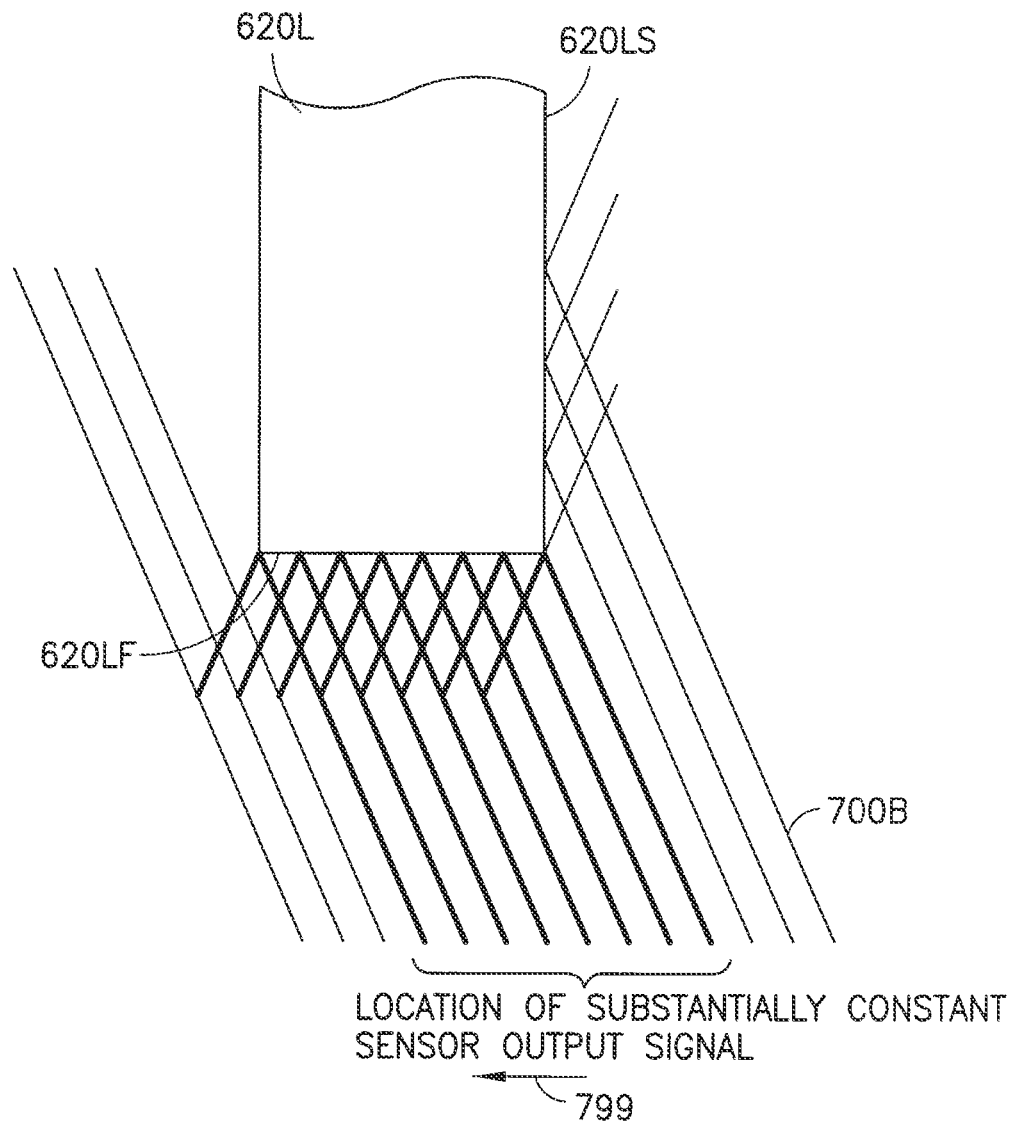
FIG. 7 is a schematic illustration of a portion of a storage shelf and sensor beam in accordance with the embodiments.

Referring also to FIG. 7, as the bot moves through the picking aisle 130A in, for example, the direction of arrow 799 the beam 700B emitted from the emitter of sensor 700 strikes the side 620LS of the slat 620 and is reflected away from the sensor (e.g. the beam is not returned to the receiver of the sensor 700). As the bot continues to move in the direction of arrow 799 the beam 700B strikes a face 620LF of the slat 620L such that the beam 700B is reflected back to the receiver of sensor 700 so that the sensor produces an output signal indicating the presence of the slat 620L. During the continual movement of the bot 110 in the direction of, for example, arrow 799 the beam 700B sweeps the face 620LF of the slat 620L such that the beam 700B continues to be reflected back to the receiver of sensor 700. As the receiver of sensor 700 receives the beam 700B the sensor 700 provides a substantially constant output signal to, for example, any suitable controller 1220 of the bot 110 (or storage and retrieval system 100 such as control server 120). As the bot continues to move in the direction of, for example, arrow 799 the beam 700B moves off of the slat face 620LF and is no longer reflected back to the receiver of the sensor 700 such that the sensor discontinues to output the substantially constant output signal to indicate no slat is present. As may be realized, as the bot moves past successive slats 620L the output signals (e.g. slat present, no slat present, slat present, etc.) generated by the sensor 700 may form of an "on/off" signal S700 as shown in FIG. 6 where the on/off output signals correspond to a pitch P (or spacing) of the slats (FIG. 8, Block 930). In this example, the signal S700 is illustrated as a square wave but may have any suitable waveform/shape. Sensor 701 may operate in the same manner as that described above with respect to sensor 700 such that the beam 701B from sensor 701 is reflected off the slat faces 620LF to produce another "on/off" signal S701. As may be realized, the "on/off" signal may be generated in a similar manner using proximity sensors where the signal is "on" when the slat is in proximity to the sensor (e.g. slat presence is detected) and "off" when there is no slat presence detected.

The two signals S700, S701 generated by the respective sensors 700, 701 form, for example, incremental encoder patterns (e.g. substantially equal pitch between slats) that may be interpreted by the controller 1220 for determining a position of the bot within, for example, the picking aisle 130A. It is noted that the pitch between slats may vary in a unique manner (while still allowing enough room for fingers 110F of the bot 110 to be inserted between the slats for picking and placing case units from the storage shelves 600) to provide an absolute encoder pattern that can be interpreted by the controller 1220 for determining the location of the bot independent of previously detected slats of the picking aisle 130A.

It is noted that the accuracy or resolution of the sensors 700, 701 may be increased by, for example, placing the sensors 700, 701 on the bot 110 such that the distance between sensors or the angle of the different sensors results in at least one of the sensors being offset from the slat pitch P by a predetermined fractional amount to effectively increase a number of slats detected by the bot for creating a finer resolution. For example, the distance L between sensors can be as follows:

$$L=mP+w,$$

where m is an integer and w is a predetermined fraction of the pitch P (e.g. P/2, P/4, . . . P/x). It is noted that the location of the slats 620L within the storage shelves 600 may be located in a predetermined configuration relative to, for example, the vertical supports 612 of the storage structure. In one example, the vertical supports 612 may not be slatted and the higher position resolution may assist in confirming the bot location so that, for example, fingers 110F (FIG. 4A) of the bot 110 do not contact the vertical supports 612 or support slats 612L while picking/placing case units from the storage shelves 600. In another example, the vertical supports 612 may have false slats disposed thereon in a manner substantially similar to that described below with respect to the transfer areas 295 of the storage and retrieval system. In still other examples, the bot position can be determined using RFID tags or barcode labels mounted throughout the storage and retrieval structure. In this example the bot 110 may include any suitable RFID or barcode reader so that the RFID tags and/or barcodes can be read as the bot 110 travels throughout the storage and retrieval system. In still other examples the location of the bot can be determined based on odometry information and feedback from the bot drive motors and their interaction with the surface the bot rides on or against as will be described below. It should be understood that any suitable combination of the above features can be used to determine the location of the bot.

The controller 1220 of the bot 110 may have access to a storage and retrieval system structure file. The structure file may include the location of each structural feature of the storage and retrieval system including the positions for each slat 620L within their respective picking aisles 130A. The structure file may be located in any suitable memory accessible by the controller 1220. In one example, the structure file may be resident in a memory 1221 of the bot 110. In other examples, the structure file may be resident in a memory of, for example, the control server 120 and accessed by the bot 110 or uploaded to a bot memory when the location of the bot 110 is being determined. The slat locations specified by the structure file may assist in qualifying the location of the slats for determining the position of the bot 110 within, for example, a picking aisle 130A. For example, when the bot qualifies a slat such as slat 620L1 of the storage shelves 600 with one of the sensors 700, 701 the controller 1220 of the bot compares an estimated location of the bot 110 using bot odometry (obtained from e.g. wheel encoders 720 as described below, which accounts for changes in diameter of the wheels due to, e.g. wear) at the instant in time when the slat 620L1 is detected with the location of the slat 620L1 as specified by the information in the structure file (FIG. 8, Blocks 940 and 950). If the comparison between the estimated bot location and the location of the slat from the structure file coincide within a predetermined tolerance the location of the bot (and the sensor sensing the slat) is qualified with the slat such that the bot 110 knows its substantially exact location within the picking aisle 130A. It is noted that the sensors 700, 701 may be located at a predetermined distance relative to, for example, a location of an effector or arm 110A (FIG. 9) of the bot 110 so that the arm 110A can be positioned, based on the sensor's determined location relative to the storage slats 620L, for inserting fingers 110F of the arm 110A between the slats for transferring containers between the bot 110 and the storage shelves 600. It is also noted that the controller 1220 may be configured to determine a state (acceleration, speed, direction, etc.) of the bot 110 as well as account for wheel slippage when determining the position of the bot within the storage and retrieval system as described in, for example, U.S. Provisional Patent Application entitled "BOT HAVING HIGH SPEED STABILITY" (Ser. No. 61/423,359) and filed on Dec. 15, 2010 (now U.S. patent application Ser. No. 13/326,447 filed on Dec. 15, 2011), the disclosures of which are incorporated by reference herein in their entireties.

In the area between slats 620L1, 620L2 the bot 110 may be configured to obtain odometry information from wheel encoders 720 of the bot 110 to substantially continuously update an estimated position of the bot 110 (e.g. by adding the distance traveled by the bot as determined from the rotation of one or more of the bot's wheels to the bots last qualified position or any other suitable previously determined position of the bot). The estimated position of the bot 110 may be based off of, for example, the position of the last slat 620L1 detected and qualified (e.g. the location is verified through comparison with the structure file) by the bot 110 (FIG. 8, Block 960). For example, when the bot 100 encounters a subsequent slat 620L2 in the direction of travel 799 through the picking aisle 130A the bot 110 calculates its estimated position using the verified position of the previously detected slat 620L1 and the information from the wheel encoders 720. The bot 110 compares this estimated position against the slat position information contained in the structure file for slat 620L2 and if the two locations (i.e. the bots estimated position and the position of the slat 620L2 obtained from the structure file) coincide within the predetermined tolerance then the bot 110 knows substantially exactly where it is located within the picking aisle 130A and the bot's position within the picking aisle 130A is updated by, for example, the bot controller 1220. If the estimated location of the bot 110 (when the sensor senses the subsequent slat 620L2) is confirmed using the information in the structure file then the slat/bot location is qualified. If there is no match or confirmation then the signal output from one or more of the sensors 700, 701 is ignored and the substantially exact position of the bot is not updated, rather the controller

1220 of the bot continues to use the estimated position obtained from the wheel encoders 720 until the location of a subsequently sensed slat is confirmed/qualified. It is noted that in the embodiments, the bot odometry may be reset each time a slat position is qualified. The resetting of the bot odometry may substantially eliminate any built up tolerance or other cumulative tracking errors generated by, for example, the wheel encoders 720. Alternatively, the bot odometry may not be reset when each slat is qualified such that the bot controller or any other suitable controller of the storage and retrieval system may be configured to account for any tolerance or cumulative tracking errors in the wheel encoders 720 when qualifying the locations of the slats and determining a position of the bot.

Figure 9:
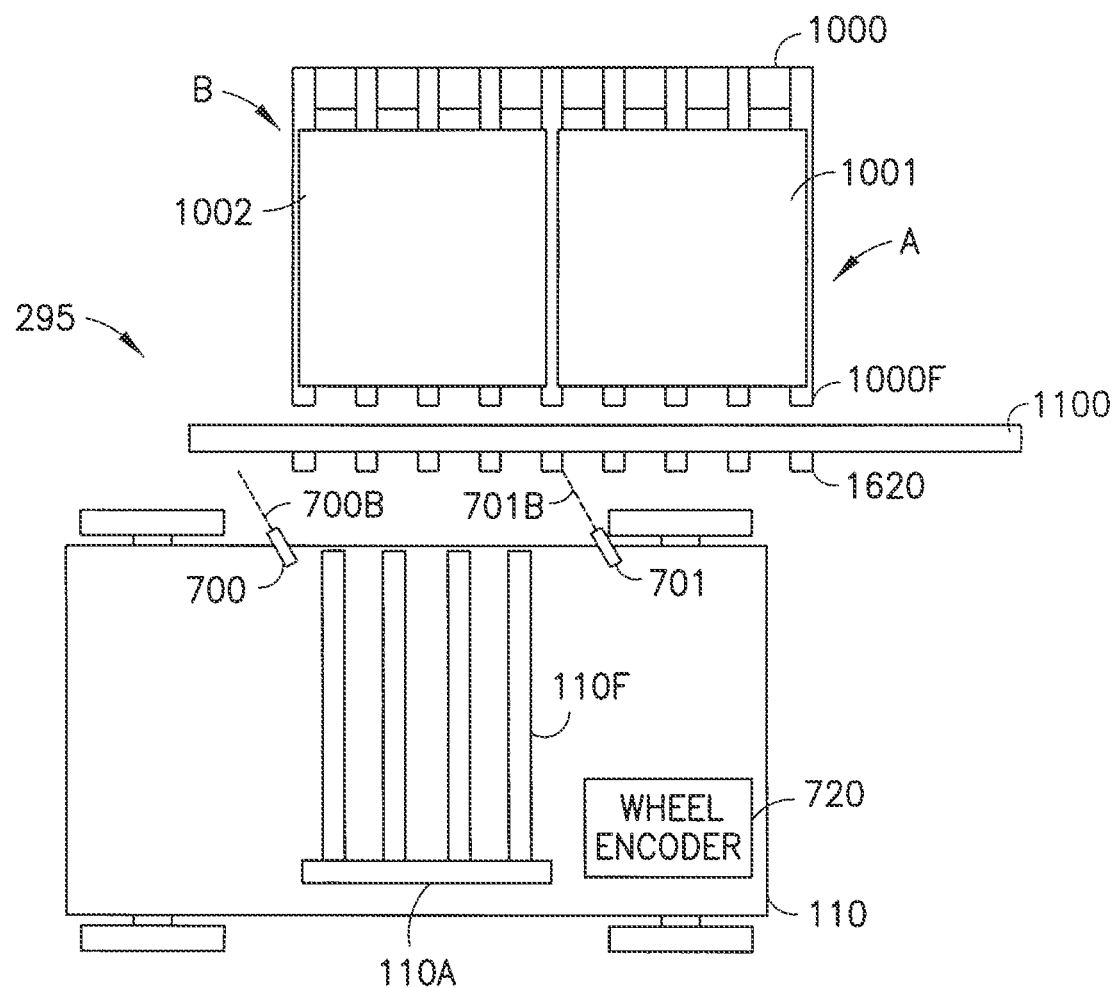
FIG. 9 is a schematic illustration of an autonomous transport vehicle and a conveyor shelf in accordance with the embodiments.

Referring to FIGS. 2 and 9 a similar bot location system, such as that described above with respect to the location of the bot in the picking aisle 130A may be used for determining the location of the bot 110 relative to holding locations A, B on shelves of the multilevel vertical conveyors 150A, 150B. As can be seen in FIG. 9 each shelf 1000 of the multilevel vertical conveyors 150A, 150B may be configured to hold multiple case units. In this example, two case units 1001, 1002 are held on the conveyor shelf 1000 in holding areas A, B having a side by side arrangement. The conveyor shelf 1000 is connected to a drive system so as to rotate around a predetermined path so that the shelf 1000 passes by the different levels of the storage and retrieval system for delivering case units to the different levels as described in, for example, U.S. patent application Ser. No. 12/757,354, entitled "LIFT INTERFACE FOR STORAGE AND RETRIEVAL SYSTEMS," and U.S. patent application Ser. No. 12/757,220, entitled "STORAGE AND RETRIEVAL SYSTEM" (both previously incorporated herein by reference).

Figure 10:
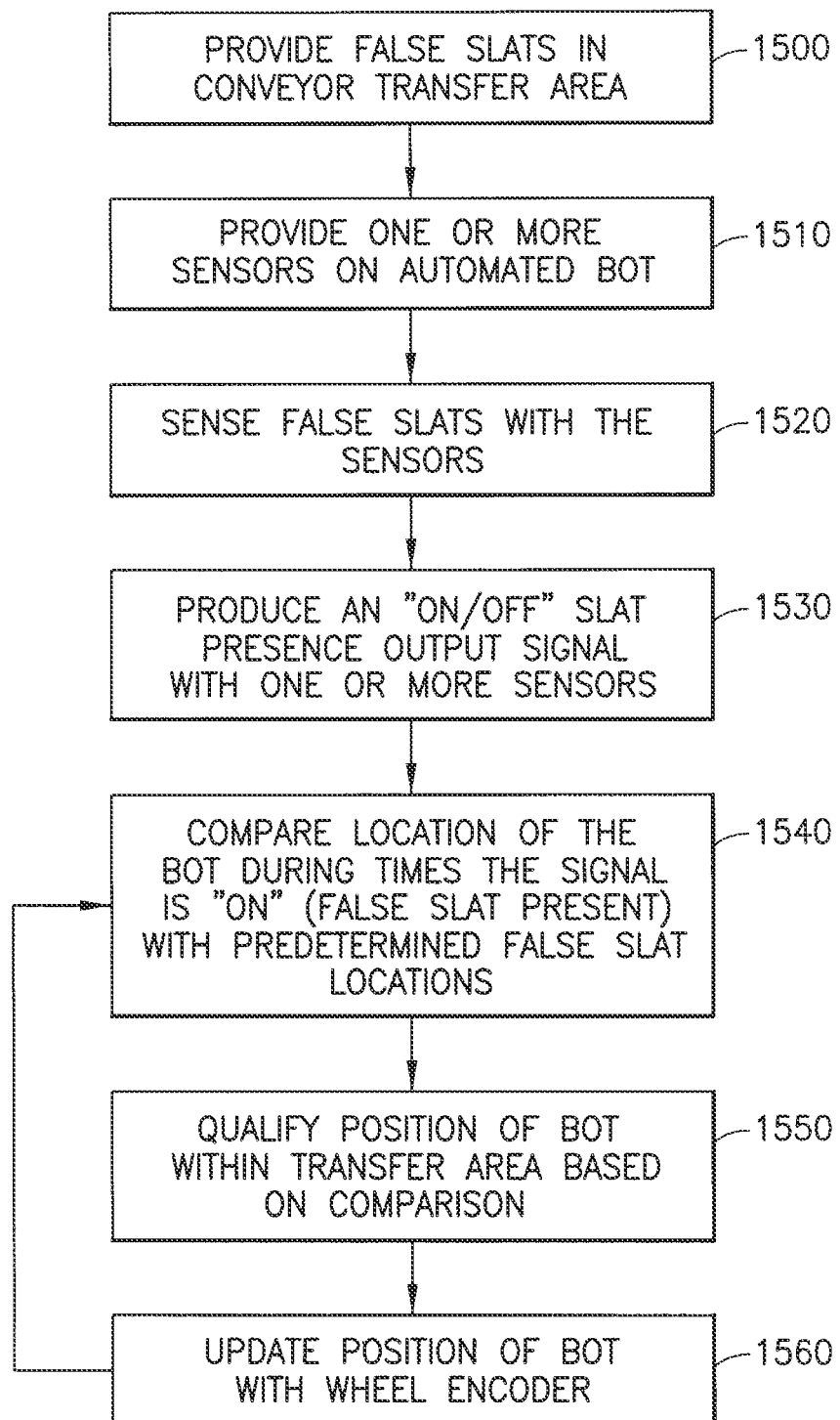
FIG. 10 is a flow diagram in accordance with the embodiments.
Figure 11:
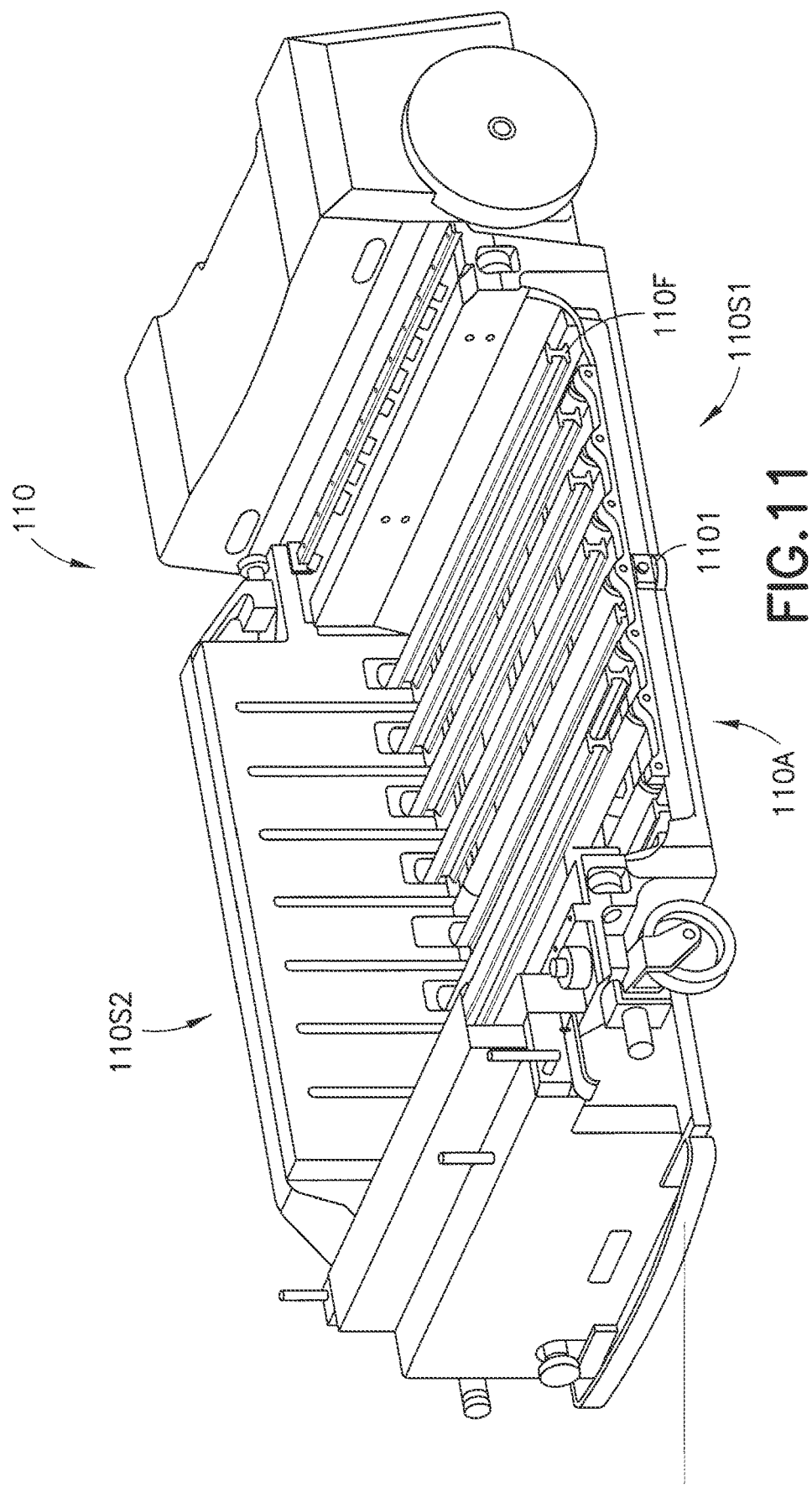
FIG. 11 is a schematic illustration of an autonomous transport vehicle in accordance with the embodiments.

The storage and retrieval system is configured so that the bot can travel into a transfer area 295 for transferring case units between the bot 110 and a holding area A, B of the conveyor shelf 1000. The transfer area 295 may have a wall 1100 or other suitable structure or surface configured to support, for example, any suitable number of false slats 1620 (FIG. 10, Block 1500). The wall 1100 may be located between the bot 110 and the conveyor shelf 1000 as the bot travels in the transfer area 295. In the embodiments, the false slats 1620 may be substantially similar to slats 620L but are merely mounted to the wall 1100 (rather than extend the depth of a storage shelf) and are not configured to hold or otherwise support case units. The false slats 1620 may be of any sufficient length (e.g. extend from the surface of the wall) to allow one or more sensors 700, 701 of the bot 110 (FIG. 10, Block 1510) to detect the false slats 1620. It should be understood that the false slats may have any suitable configuration for, in the case of beam sensors 700, 701, reflecting the sensor beams 700B, 710B back to the sensors for locating the bot 110 relative to the holding locations A, B of the conveyor shelf 1000 in a manner substantially similar to that described above. Where, for example, proximity sensors are used the false slats may have any suitable configuration for interacting with the proximity sensors. It should also be understood that the false slats 1620 may have any suitable configuration for interacting with any suitable sensors of the bot 110 for causing the sensors to output the "on/off" signal(s) described above.

While the false slats are illustrated in FIG. 9 as protruding from the wall 100, the false slats 1620 may be substantially flat surfaces configured to interact with the sensors 700, 701 in the manner described herein. For example the wall or structure 1100 may have an anti-reflective surface on which reflective objects are mounted. The reflective objects may be used in a manner substantially similar to that of the false slats 1620 for interacting with the sensors 700, 701 and generating the on/off sensor signals S700, S701.

In operation, the bot 110 may receive instructions from, for example, the control server 120 to transfer a case unit, such as case unit 1001, 1002, to or from the conveyor shelf 1000. The instructions may indicate which holding area A, B of the conveyor shelf 1000 the case unit is located. The bot 110 may travel into a transfer area 295 corresponding to the conveyor shelf 1000 from/to which the bot 110 is to transfer a case unit. During travel in the transfer area 295, one or more sensors 700, 701 of the bot 110 may sense or otherwise detect the false slats 1620 in the manner described above with respect to slats 620L (FIG. 10, Block 1520). As each slat is detected an "on/off" signal, similar to signals S700, S701 described above may be generated through sensor output (FIG. 10, Block 1530). The bot 110 may compare the location of the bot at the times the false slats 1620 are detected with, for example, predetermined false slat locations within the storage and retrieval system structure file (FIG. 10, Block 1540). The position of each of the false slats 1620 may be correlated to a respective holding position A, B of the conveyor shelf 1000 such that if the false slat position detected by the bot and the predetermined position match within a predetermined tolerance the bot knows substantially exactly where it is located within the transfer area 295 relative to the holding areas A, B of the conveyor shelf 1000 (FIG. 10, Block 1550). It is noted that the locations of the false slats 1620 correspond to the location of the fingers 1000F of the conveyor shelf 1000 so that the fingers 110F of the bot arm 110A can be aligned between the false slots 1620 for extending between the fingers 1000F without contact for picking/placing case units to the conveyor shelf 1000.

In a manner substantially similar to that described above, if the false slat 1620 position detected by the bot 110 and the predetermined position of the false slats, as specified in the structure file, do not match within the predetermined tolerance the sensor signal corresponding to the detected false slat may be ignored. Where the number of false slats or the length of the transfer area 295 does not allow for the bot 110 to travel to another false slat for determining its position within the transfer area 295, the bot may change its travel direction so that the false slats 1620 can be re-detected by the bot 110. There may be a "starting false slat" that provides the bot 110 with an absolute position location within the storage structure. The starting false slat may be located at a predetermined position within the transfer area 295 such as at a beginning or entrance of the transfer area 295. If the bot's 110 position cannot be determined within the transfer area via the false slat detection, the bot may travel to the location of the "starting false slat" and re-detect the false slats 1620 in the manner described herein. The bot 110 may also obtain information from the wheel encoder(s) 720 for continually updating an estimate of its position in a manner similar to that described above (FIG. 10, Block 1560) when, for example, the bot sensors are located between the false slats or if the position of the bot 110 cannot otherwise be determined from the false slats 1620.

In a manner similar to that described above, the false slats 1620 may be arranged to form an incremental or absolute encoding system for determining the location of the bot 110 relative to the holding areas A, B of the conveyor shelf so that the fingers 110F of the bot 110 can be aligned with a case unit, which in this example is case unit 1002, on the conveyor shelf 1000. It is noted that, in one example, the false slats 1620 may extend the length of the transfer area 295 while in other examples the false slats 1620 may be located only at the multilevel vertical conveyor access location (e.g. where the bot 110 stops to access the conveyor shelf 1000) of the transfer area 295. It is noted that lines may be affixed or otherwise disposed on decks or other suitable locations, such as the walls, of the transfer area 295 and/or multilevel vertical conveyor access location. These lines may be disposed transverse to the direction of bot travel at predetermined locations so that sensors on the bot 110 can detect the lines as the bot travels through the transfer area 295 and/or multilevel vertical conveyor access location for determining a position of the bot within the storage and retrieval system. It should be realized that the line or lines may alternatively be placed on the bottom or sides of the bot and sensors may be located on the deck or walls of the storage and retrieval system so that the sensor can detect the lines on the bot as the bot passes by the sensor for determining a location of the bot.

Referring again to FIG. 4 in the embodiments the bot 110 may also include one or more suitable case sensors 703, 704 configured for sensing case units 101 stored on the shelves 600. Some non-limiting examples, of case unit sensors can be found in, for example, U.S. patent application Ser. No. 12/757,312, previously incorporated by reference herein. In one example, the case sensors 703, 704 may include one or more of a laser sensor and ultrasonic sensor. In another example, the case sensors 703, 704 may be substantially similar to sensors 700, 701 described above. The case sensors 703, 704 may be configured to allow the bot 110 to sense each case unit 101 as the bot travels along a picking aisle. The case sensors 703, 704 may be connected to any suitable controller such as, for example, control server 120 and/or bot controller 1220 such that patterns or sequences of case units 101 may be recognized for assisting in a location determination of the bot 110. For example, the control server 120 may include a "map" or "fingerprint" of case units (including their respective sizes, positions, spacing between the case units, etc.) for each picking aisle. As the bot 110 travels through the picking aisle the controller, such as control server 120 (or bot controller 1220) may receive and interpret signals from the case sensors 703, 704 indicating, for example, the sizes and relative positions of the case units 101 the bot is passing. The control server 120, for example, may compare these signals with the case unit map/fingerprint for determining, for example, which aisle the bot is in and which portion of the aisle the bot is in (e.g. the location of the bot within the aisle). In one example, as the bot 110 turns down a picking aisle the case units 101 may be sensed and the control server 120 may determine if the bot 110 is in the correct aisle based on the sensed case units. It is noted that the fingerprint of cases may be dynamic as cases are added and removed from the shelves 600.

Figure 15:
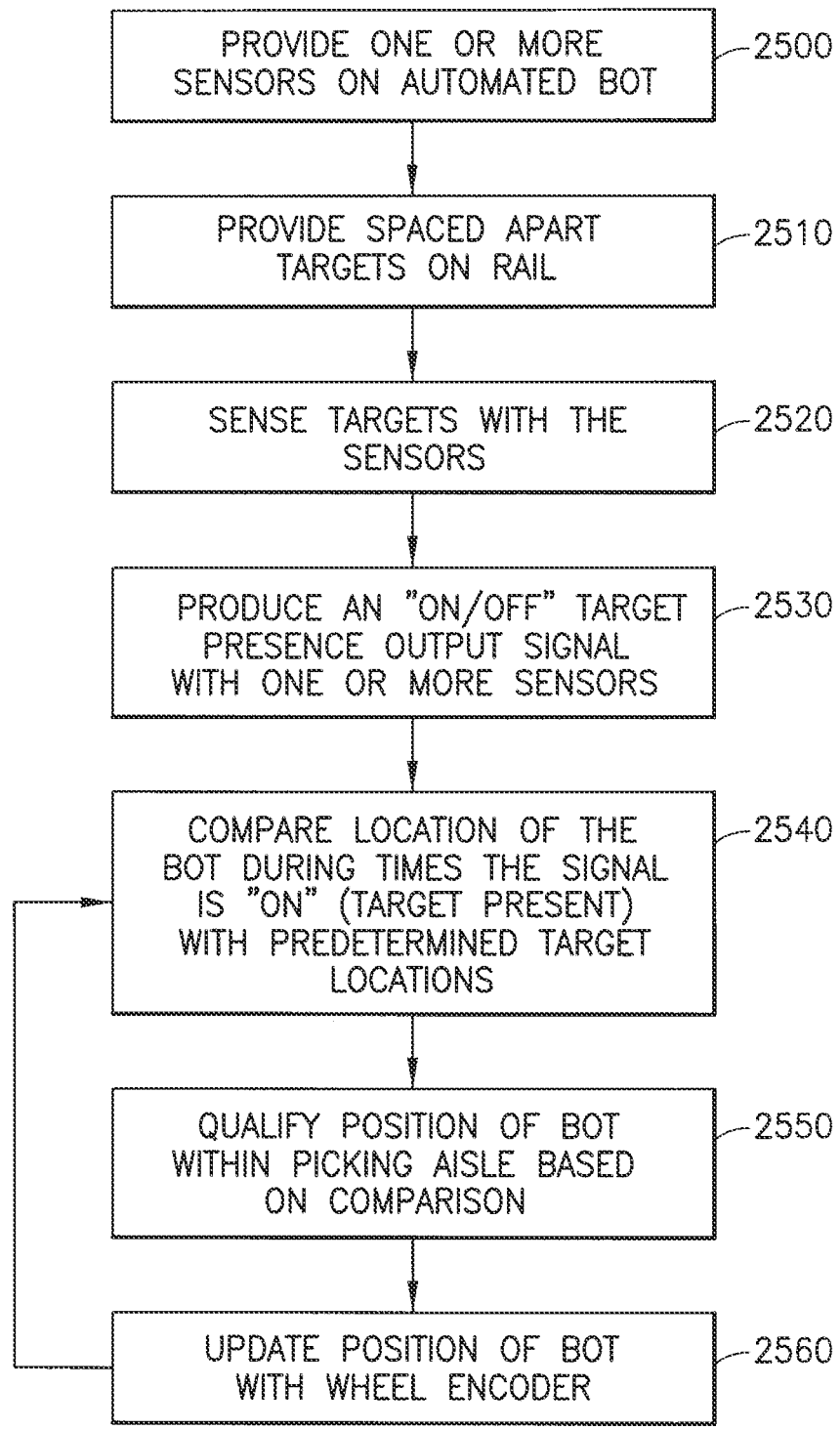
FIG. 15 is a flow diagram in accordance with the embodiments.

Referring to FIGS. 11-15, a bot location system using proximity sensors for determining the location of the bot in the picking aisle 130A and/or relative to holding locations A, B on shelves of the multilevel vertical conveyors 150A, 150B is illustrated. In this aspect the bot 110 includes at least one proximity sensor module 1101 mounted to the frame of the bot (FIG. 15, Block 2500). The proximity sensor module 1101 may be mounted to the frame at any suitable location and for exemplary purposes is shown as being mounted to the frame below the payload holding area of the bot. Here the sensors are located on the bot as a position for sensing targets or position determining features 1201-1203 disposed on the rails 1300 on which the bot travels through the picking aisles 130A (and/or on walls of the transfer area 295 and/or multilevel vertical conveyor access location—not shown—in a manner substantially similar to that described above). In one aspect the proximity sensor module 1101 includes a sensor mount 1101M that is movably mounted to the frame of the bot 110 in any suitable manner. In one example, the sensor mount 1101M may be spring loaded or otherwise compliant such that the sensor mount is slidably movable in the direction of arrow 1400 and biased outwards towards/against the rail 1300 (and/or walls of the transfer area 295 and/or multilevel vertical conveyor access location) as the bot 110 moves through the picking aisles (or transfer areas/multilevel vertical conveyor access locations). In one aspect, the sensor mount 1101M may have an integrally formed guide member 1101G that rides along in substantial contact with the rail 1300 (e.g. the guide member is held against the rail 1300 by the biasing force BF of the spring loaded mount) so that a substantially constant distance SX is maintained between the targets 1201-1203 and the proximity sensor 1101S regardless of position variance between the bot 110 frame and the targets. In other aspects the guide member 1101G may be affixed or otherwise mounted to the sensor mount 1101M in any suitable manner. The distance SX may be any suitable distance that allows the proximity sensor to sense the targets 1201-1203. In one example, the distance SX may be about 2 mm while in other examples the distance SX may be more or less than about 2 mm. The proximity sensor 1101S may be mounted or otherwise affixed to the sensor mount 1101M in any suitable manner and may be any suitable proximity sensor (e.g. magnetic sensors, capacitance sensors, inductance sensors and the like). For exemplary purposes only the proximity sensor may be a Hall effect sensor. It is also noted that while only one sensor module 1101 is shown on the bot 110 in other aspects there may be more than one sensor module 1101 disposed at any suitable locations on the bot for sensing the targets 1201-1203.

As noted above, and referring to FIG. 12, the targets 1201-1203 may be provided on the rails 1300 of the picking aisles and/or walls of the transfer area 295 and/or multilevel vertical conveyor access location (FIG. 15, Block 2510). In one aspect, the targets 1201-1203 may be provided on the rails on both sides of the picking aisle 130A so that the proximity sensor 1101 of the bot may determine its position within the picking aisle by sensing the targets regardless of which travel orientation the bot enters the picking aisle to allow the bot to pick from both sides of the aisle. In other aspects the targets may be provided on but one side of the picking aisle and at least one proximity sensor module 1101 may be disposed on both lateral sides 110S1, 110S2 of the bot so that the targets on but one side of the aisle can be sensed by the proximity sensors of the bot regardless of the travel orientation of the bot for allowing the bot to pick from both sides of the aisle. As may be realized the targets 1201-1203 may be located on rails in a reference frame of the storage shelf or storage shelf area. For example, the targets 1201-1203 may have a predetermined relationship with the slats 620L1, 620L2 or other any other suitable feature of the storage shelf (such as when the storage shelf is configured without slats or otherwise). The targets 1201-1203 may be integrally formed with the rails 1300 or otherwise mounted to or affixed to the rails 1300 in any suitable manner. In one aspect the targets 1201-1203 may be formed in the rails 1300 during manufacture of the rails 1300. The targets 1201-1203 may have any suitable configuration that allows the targets to be sensed or otherwise detected by the proximity sensor 1101 of the bot 110. For exemplary purposes only, in one aspect the targets 1201-

1203 may be apertures, such as e.g. slots or holes, or recesses provided in a side wall 1300B of the rails 1300. Also for exemplary purposes only, the slots may be about 6 mm wide by about 12 mm tall slots or slots having any other suitable dimensions. In other aspects the targets 1201-1203 may be any suitable target for influencing the proximity sensor 1101 to produce an on/off signal as will be described below. The targets 1201-1203 may be provided in the rails 1300 at predetermined spaced intervals (e.g. the distances between the targets and the location of each target is known) so that the targets 1201-1203, along with the proximity sensor 1101, form an incremental (or absolute) and discrete position encoder for determining a location of the bot within, for example, a picking aisle 130A or any other suitable location within the storage and retrieval system 100. In one aspect the targets 1201-1203 may be spaced about 0.3048 m (about 1 ft) from each other. In other aspects the targets 1201-1203 may be spaced by a distance that is more or less than about 0.3048 m. In still other aspects the targets 1201-1203 may have a varied spacing between the targets that provides for an absolute position determination within, for example, a picking aisle or any other suitable location of the storage structure.

As noted above the targets 1201-1203 may also be disposed at walls of the transfer area 295 and/or multilevel vertical conveyor access location. In a manner substantially similar to that described above, the targets 1201-1203 may be integrally formed in the walls of the transfer area 295 and/or multilevel vertical conveyor access location or otherwise affixed in any suitable manner to the walls. The targets 1201-1203 at the transfer area 295 and/or multilevel vertical conveyor access location may be located on the walls in a reference frame of a respective one of the transfer area 295 and/or multilevel vertical conveyor so that the targets 1201-1203 have a predetermined relationship with, for example, a shelf of the multilevel vertical conveyor or any other reference point at the transfer station or of the multilevel vertical conveyor in a manner substantially similar to that described above with respect to the picking aisles.

In a manner similar to that described above, the controller 1220 of the bot 110 may have access to a storage and retrieval system structure file. The structure file may include the location of each structural feature of the storage and retrieval system including the positions for each target 1201-1203 within their respective picking aisles 130A. The target 1201-1203 locations specified by the structure file may assist in qualifying the location of the targets for determining the position of the bot 110 within, for example, a picking aisle 130A. For example, as the bot travels along, for example, a picking aisle the bot 110 senses the targets 1201-1203 (FIG. 15, Block 2520) with the proximity sensor module 1101 such that the proximity sensor module 1101 produces an on/off signal (FIG. 15, Block 2530) in a manner substantially similar to that described above. The bot 110 qualifies the target(s) 1201-1203 of the rail 1300 with the proximity sensors 1101 where the controller 1220 of the bot compares an estimated location of the bot 110 using bot odometry (obtained from e.g. wheel encoders 720 in a manner substantially similar to that described above) at the instant in time when the target 1201-1203 is sensed with the location of the target 1201-1203 as specified by the information in the structure file (FIG. 15, Block 2540). If the comparison between the estimated bot location and the location of the target 1201-1203 from the structure file coincide within a predetermined tolerance the location of the bot (and the sensor sensing the slat) is qualified (FIG. 15, Block 2550) with the target 1201-1203 such that the bot 110 knows its substantially exact location within the picking aisle 130A.

In a manner substantially similar to that described above, in the area between targets 1201-1203 the bot 110 may be configured to obtain odometry information from wheel encoders 720 of the bot 110 to substantially continuously update an estimated position of the bot 110 (e.g. by adding the distance traveled by the bot as determined from the rotation of one or more of the bot's wheels to the bots last qualified position or any other suitable previously determined position of the bot) for updating a position of the bot 110 with the wheel encoders (FIG. 15, Block 2560). For example, the estimated position of the bot 110 in the area between targets 1201-1203 may be based off of, for example, the position of the last target 1201-1203 detected and qualified (e.g. the location is verified through comparison with the structure file) in a manner substantially similar to that described above. The bot odometry may be used to align the fingers 110F of the arm 110A with the slats for transferring containers between the bot 110 and the storage shelf 600.

It is noted that, the positioning of the bot within, for example, the picking aisles 130A may be decoupled from the structure of the storage shelves 600. For example, if the slats 620L1, 620L2 become deformed or bent this deformation will have substantially no impact on the location determination of the bot within the picking aisles as the targets 1201-1203 being sensed by the proximity sensor 1101S are disposed on the rails 1300. This allows for the modification and/or replacement of the slats 620L1, 620L2 without substantially impacting the ability of the bot to determine its location within the storage and retrieval system. As may be realized, in one aspect, there may be some correlation between the targets 1201-1203 and the slats 620L1, 620L2 to allow for inserting fingers 110F of the arm 110A between the slats for transferring containers between the bot 110 and the storage shelves 600. In other aspects the bot 110 may include any suitable sensors, such as those described above, for detecting the positions of the slats to allow for inserting fingers 110F of the arm 110A between the slats for transferring containers between the bot 110 and the storage shelves 600.

Figure 16:
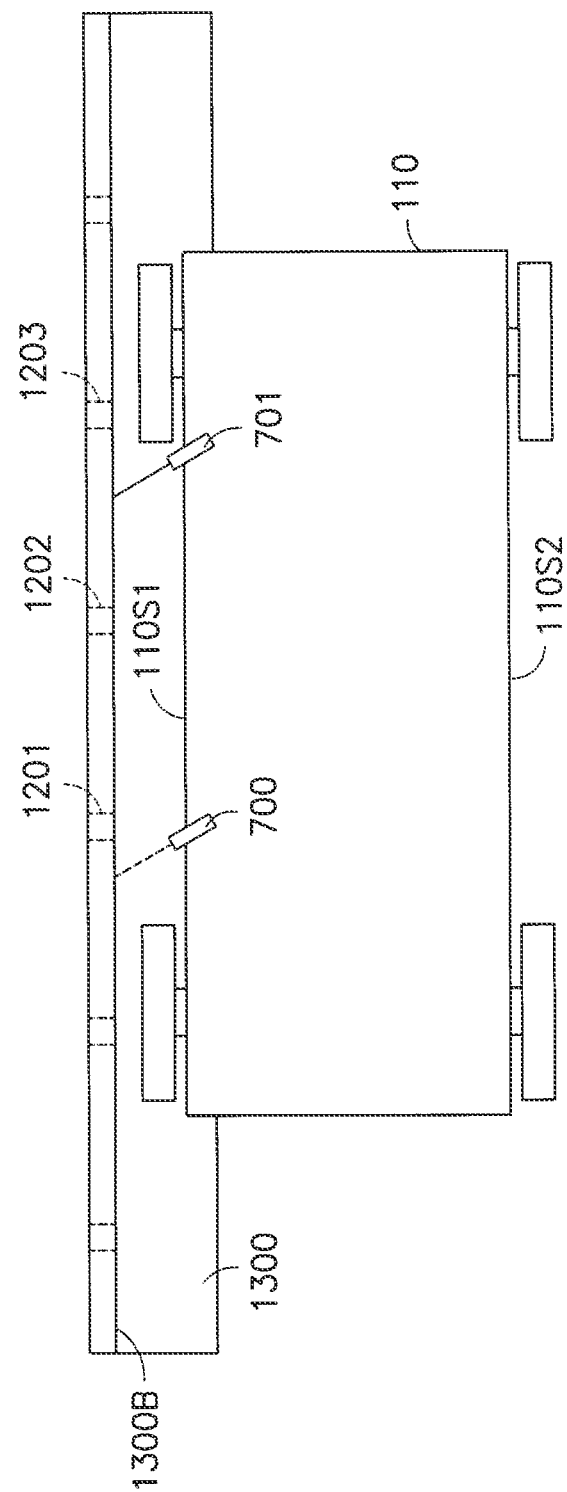
FIG. 16 is a schematic illustration of a portion of a picking aisle and a transport vehicle in accordance with the embodiments.

Referring now to FIG. 16, in one aspect of the disclosed embodiment, the beam sensors 700, 701 described above with respect to FIGS. 4A-10 may be positioned on the frame of the bot below the payload carrying area in a manner substantially similar to the proximity sensor 1101. The sensors 700, 701 may be positioned to sense the targets 1201-1203 on the rails 1300 so that as each target 1201-1203 is sensed by a respective sensor 700, 701 that sensor produces an on/off signal in a manner substantially similar to that described above with respect to the slat detection for determining a position of the bot in a manner substantially similar to that described above. As may be realized, the bot may have sensors 700, 701 on both lateral sides of the bot 110S1, 110S2 so that the sensors 700, 701 may detect the targets 1201-1203 regardless of the travel orientation of the bot where the targets 1201-1203 are located on but one rail 1300 in the picking aisle 130A.

In other aspects the bot 110 may include both the beam sensors 700, 701 and one or more proximity sensors 1101 that are used in conjunction with each other for determining a position of the bot within the storage structure. In one aspect the proximity sensors 1101 may be used to determine a location of the bot within the picking aisle 130A while the beam sensors 700, 701 may be used to determine a location of the bot in an area between the targets 1201-1203 for aligning the arm 110A of the bot with the slats on the storage shelf 600 for transferring containers between the bot 110 and the shelf 600. In other aspects the beam sensors 700, 701 and proximity sensors 1101 may be used in any suitable manner for determining a location of the bot within the storage structure and for transferring containers between the bot 100 and the storage shelves 600.

Figure 17:
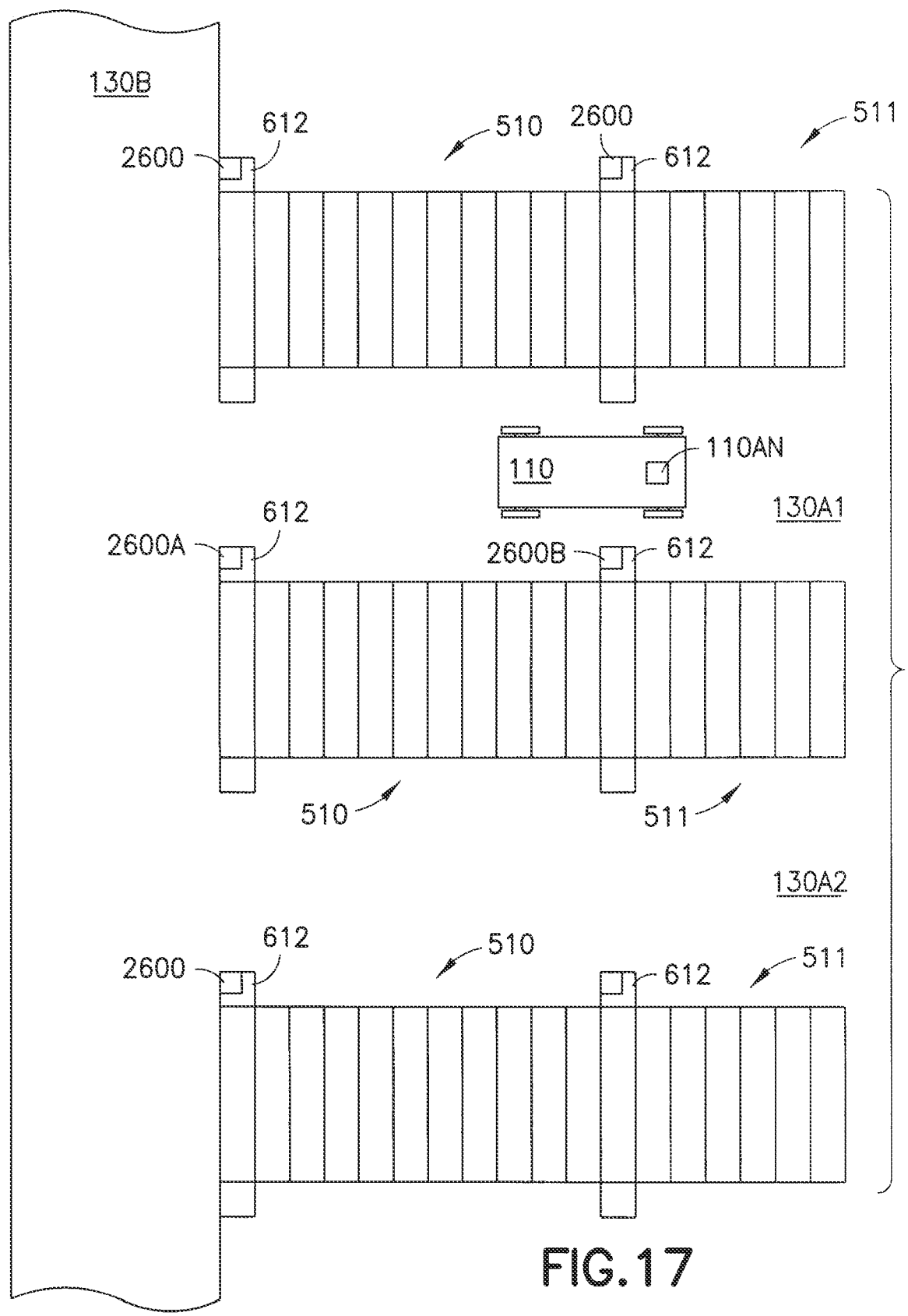
FIG. 17 is a schematic illustration of a portion of the storage and retrieval system in accordance with the embodiments.

Referring now to FIG. 17 the storage and retrieval system may also include a bot location system for locating the bot upon, for example, initialization of the bot and during, for example, travel of the bot along the transfer deck 130B. In one aspect, the bot location system may use radio waves for determining a location of the bot and include any suitable number of transmitters and receivers. In other aspects the bot location system may use any suitable devices capable of allowing for a position determination of the bot such as, for example, optical transmitters and receivers and acoustic transmitter and receivers. In one aspect radio device 2600, such as transponders, transceivers, transmitters, etc., may be placed at any suitable locations within the storage structure on, for example, the vertical 612 or horizontal 610, 611 (FIG. 3) supports of the storage structure. For exemplary purposes, the radio devices 2600 may be placed at the intersection between each picking aisle 130A and the transfer deck 130B and at each storage bay 510, 511 of the picking aisles 130A. In one aspect the radio devices 2600 may be passive radio devices such as radio frequency identification (RFID) tags while in other aspects the radio devices may be active devices. Where the radio devices 2600 are passive the bot 110 may include a transceiver and antenna 110AN that is configured to communicate with and energize the transponders 2600 for receiving information stored in the transponders 2600. The information stored in the transponders may include a storage aisle identification, a storage bay identification, a multilevel vertical conveyor location, transfer deck location and/or any other location information pertaining to a location within the storage structure. The bot 110 may be configured to interrogate the radio devices 2600 at any suitable times during the operation of the bot such as when travelling through the storage structure or upon initialization (e.g. turning on) of the bot 110. In one aspect when a bot 110 is initialized within the storage structure the bot 110 may interrogate one or more nearby radio devices 2600 and receive position information from the devices 2600 as to where the bot is located. In the example, shown in FIG. 17 the bot 110 may receive information from radio devices 2600A, 2600B that is processed by, for example, controller 1220 indicating the bot is located in aisle 130A1 between bays 510 and 511. This position information may provide an initial location of the bot 110 that may be supplemented and refined by position information received from one or more of the sensors 700, 701, 1101. In other aspects, the radio devices 2600 may be interrogated by the bot 110 while the bot 110 is moving at substantially high speeds along the transfer deck and picking aisles such that when the bot 110 receives position information from the radio devices 2600 that the bot 100 is located at a predetermined location the bot may slow down and obtain position information from one or more of the sensors 700, 701, 1101. As may be realized, the radio devices 2600 and the transceiver and antenna 110AN may also be used to obtain a position of the bot 110 with any desired accuracy such as through any suitable analysis of the signals received from the radio devices 2600 that may or may not be supplemented by position information obtained from sensors 700, 701, 1101.

In a first aspect of the disclosed embodiment a storage and retrieval system is provided. The storage and retrieval system includes a storage structure having storage shelves, each storage shelf having slats for supporting stored items where the slats are spaced apart from each other by a predetermined distance. An autonomous transport vehicle is also provided where the autonomous transport vehicle includes at least one sensor configured to sense each of the slats and output a signal indicating when a slat is sensed. A controller is provided for verifying a location of the autonomous transport vehicle within the storage structure based on at least the output signal.

In accordance with a first sub-aspect of the first aspect of the disclosed embodiment the controller is configured to compare a location of the autonomous transport vehicle at a time the slat is sensed with a predetermined location of the slat and updating a verified location of the autonomous transport vehicle if the locations substantially coincide.

In accordance with the first sub-aspect of the first aspect of the disclosed embodiment, the controller is configured to ignore the output signal of the at least one sensor where the locations do not substantially coincide.

In accordance with a second sub-aspect of the first aspect of the disclosed embodiment, the controller is configured to continuously update an estimated location of the autonomous transport vehicle based on a last known verified location of the autonomous transport vehicle.

In accordance with the second sub-aspect of the first aspect of the disclosed embodiment, the autonomous transport vehicle includes at least one wheel encoder and the controller is configured to obtain wheel encoder information for updating the estimated location of the autonomous transport vehicle.

In accordance with a third sub-aspect of the first aspect of the disclosed embodiment the autonomous transport vehicle is configured to align transfer arm fingers of the autonomous transport vehicle with spaces located between the slats of a respective storage shelf based on the determined location of the autonomous transport vehicle for extending the transfer arm fingers into the spaces without contacting the slats.

In accordance with the first aspect of the disclosed embodiment the autonomous transport vehicle includes a case unit detection sensor configured for detecting case units located on the storage shelf and the controller is configured to determine a position of the autonomous transport vehicle based on the sensed case units.

In accordance with a second aspect of the disclosed embodiment, a storage and retrieval system is provided. The storage and retrieval system includes at least one multilevel vertical conveyor having at least one shelf having support finger. At least one wall is also provided adjacent the multilevel vertical conveyor, the wall including protrusions substantially aligned with the support fingers. An autonomous transport vehicle is provided where the autonomous transport vehicle includes at least one sensor configured to sense each of the protrusions and output a signal indicating when a protrusion is sensed. A controller is provided and is configured to determine a location of the autonomous transport vehicle relative to the support fingers based on the output signal from the at least one sensor.

In accordance with the second aspect of the disclosed embodiment the autonomous transport vehicle includes a transfer arm having transfer fingers, the autonomous transport vehicle being configured to align the transfer arm fingers with spaces located between the support fingers of the at least one shelf based on the determined location of the autonomous transport vehicle for extending the transfer arm fingers into a path of the shelf without substantial contact with the supporting fingers.

In accordance with the second aspect of the disclosed embodiment, the at least one shelf includes at least two item holding locations and the autonomous transport vehicle includes a transfer arm, the autonomous transport vehicle being configured to align the transfer arm with one of the at least two item holding locations based on the output signal from the at least one sensor.

In accordance with a third aspect of the disclosed embodiment an encoder for determining a position of an autonomous transport vehicle is provided. The encoder includes at least one slat mounted adjacent a travel lane of the autonomous transport vehicle, at least one sensor mounted on the at least one autonomous transport vehicle where the at least one sensor is configured to sense the at least one slat and output a presence signal when each of the at least one slat is sensed, and a controller configured to receive the presence signal and determine a location of the autonomous transport vehicle along the travel path based on the presence signal.

In accordance with the third aspect of the disclosed embodiment, the at least one slat comprises item supports of a storage shelf.

In accordance with the third aspect of the disclosed embodiment, the at least one slat comprises a protrusion mounted on a wall adjacent the travel lane.

In accordance with the third aspect of the disclosed embodiment, the at least one sensor comprises at least one of a beam sensor and a proximity sensor.

In accordance with the third aspect of the disclosed embodiment, wherein each of the at least one slats are spaced from each other by a predetermined pitch and a distance between each of the at least one sensors are spaced apart from each other by a fractional portion of the pitch.

In accordance with the third aspect of the disclosed embodiment, the at least one sensor is angled relative to a face of the at least one slat.

In accordance with the third aspect of the disclosed embodiment, a spacing between each of the at least one slats effects an incremental determination of the location of the autonomous transport vehicle.

In accordance with the third aspect of the disclosed embodiment, a spacing between each of the at least one slats effects an absolute determination of the location of the autonomous transport vehicle.

In accordance with a first sub-aspect of the third aspect of the disclosed embodiment, the controller is configured to compare a location of the autonomous transport vehicle at the time a slat is sensed with a predetermined location of the sensed slat for verifying the location of the autonomous transport vehicle.

In accordance with the first sub-aspect of the third aspect of the disclosed embodiment, the controller is configured to update a location of the autonomous transport vehicle when the location of the autonomous transport vehicle at the time a slat is sensed and the predetermined location of the sensed slat coincide.

In accordance with the first sub-aspect of the third aspect of the disclosed embodiment, the controller is configured to ignore the presence signal generated when the location of the autonomous transport vehicle at the time a slat is sensed and the predetermined location of the sensed slat do not coincide.

In accordance with the third aspect of the disclosed embodiment, the autonomous transport vehicle includes at least one wheel encoder, the controller being configured to obtain information from the wheel encoder and determine an estimated location of the autonomous transport vehicle from the wheel encoder information and based on a previously determined location of the autonomous transport vehicle.

In accordance with a fourth aspect of the disclosed embodiment, a storage and retrieval system is provided. The storage and retrieval system includes a storage shelf structure having stationary positioning determining features with respect to a reference feature of the storage shelf structure where the positioning determining features are spaced apart from each other by a predetermined distance, an autonomous transport vehicle including at least one sensor configured to sense each of the positioning determining features and output a signal when a target is sensed as the autonomous transport vehicle moves past the positioning determining features, where the bot is configured for both mechanically constrained travel and mechanically unconstrained travel, and a controller configured to verify a location of the autonomous transport vehicle relative to the storage shelf structure based on at least the output signal.

In accordance with a fourth aspect of the disclosed embodiment, the targets include slats forming part of the storage shelf structure and configured to support stored items on the storage shelf structure.

In accordance with a first sub-aspect of the fourth aspect of the disclosed embodiment, the storage and retrieval system further includes rails disposed in picking aisles and configured to mechanically constrain travel of the autonomous transport vehicle and to provide access to the storage shelves wherein the positioning determining features include apertures formed in the rails.

In accordance with the first sub-aspect of the fourth aspect of the disclosed embodiment, the positioning determining features are of unitary construction with the storage shelf structure that defines the positioning determining features.

In accordance with the fourth aspect of the disclosed embodiment, the at least one sensor includes an optical sensor.

In accordance with the fourth aspect of the disclosed embodiment, the at least one sensor includes a proximity sensor.

In accordance with the fourth aspect of the disclosed embodiment, the at least one sensor includes a Hall effect sensor.

In accordance with a second sub-aspect of the fourth aspect of the disclosed embodiment, the positioning determining features include radio devices disposed at predetermined locations on supports of the storage structure and the at least one sensor includes at least an antenna for interrogating the radio devices and obtaining information regarding a predetermined location of an interrogated radio device.

In accordance with the second sub-aspect of the fourth aspect of the disclosed embodiment, the positioning determining features and at least the antenna are configured to provide a position of the autonomous transport vehicle upon an initialization of the autonomous transport vehicle.

In accordance with the fourth aspect of the disclosed embodiment, the sensor is movably mounted to the autonomous transport vehicle and biased towards the stationary positioning determining features.

It should be understood that the exemplary embodiments disclosed herein can be used individually or in any suitable combination thereof. It should also be understood that the foregoing description is only illustrative of the embodiments. Various alternatives and modifications can be devised by those skilled in the art without departing from the embodiments. Accordingly, the present embodiments are intended to embrace all such alternatives, modifications and variances that fall within the scope of the appended claims.

What is claimed is:

1. An autonomous transport vehicle for a storage and retrieval system having a storage structure with storage shelves, the vehicle comprising:
   a frame and drive section for autonomous traverse of the storage structure;
   a vehicle position determining system connected to the frame configured so as to interface a positioning system including positioning determining features having at least one Radio Frequency Identification (RFID) disposed at predetermined locations on supports connected to the storage shelves that are spaced apart from each other by a predetermined distance, wherein:
      the vehicle position determining system includes at least one sensor that includes at least an antenna, for interrogating the at least one RFID and obtaining position information based on the predetermined location of an interrogated RFID, and outputs a signal related to the position information from the interrogated RFID; and
   a controller for determining, based on the position information from the interrogated RFID, a location of the autonomous transport vehicle within the storage structure based on at least the output signal.

2. The autonomous transport vehicle of claim 1, wherein the controller is configured so as to verify the location of the autonomous transport vehicle, within the storage structure, with the determined location based on the position information from the interrogated RFID.

3. The autonomous transport vehicle of claim 1, wherein the positioning determining features are configured to provide a position of the autonomous transport vehicle upon an initialization of the autonomous transport vehicle.

4. The autonomous transport vehicle of claim 1, wherein the controller is further configured to ignore the output signal of the at least one sensor where the locations do not substantially coincide.

5. The autonomous transport vehicle of claim 2, wherein the controller is configured to continuously update an estimated location of the autonomous transport vehicle based on a last known verified location of the autonomous transport vehicle.

6. The autonomous transport vehicle of claim 5, wherein the autonomous transport vehicle includes at least one wheel encoder and the controller is further configured to obtain wheel encoder information for updating the estimated location of the autonomous transport vehicle.

7. The autonomous transport vehicle of claim 1, wherein the autonomous transport vehicle includes a case unit detection sensor configured to detect case units located on the storage shelf and the controller is further configured to determine a position of the autonomous transport vehicle based on the sensed case units.

8. A method comprising:
   providing an autonomous transport vehicle having a frame and drive section for autonomous traverse of a storage structure, with storage shelves, of a storage and retrieval system;
   providing a vehicle position determining system connected to the frame to interface a positioning system including positioning determining features having Radio Frequency Identifications (RFID(s)) disposed at predetermined locations on supports connected to each storage shelf that are spaced apart from each other by a predetermined distance;
   interrogating the RFID(s) with at least one sensor of the vehicle position determining system that includes at least an antenna, and obtaining position information based on the predetermined location of an interrogated RFID, and outputting a signal related to the position information from the interrogated RFID; and
   determining, with a controller, based on the position information from the interrogated RFID, a location of the autonomous transport vehicle within the storage structure based on at least the output signal.

9. The method of claim 8, further comprising verifying, with the controller, the location of the autonomous transport vehicle, within the storage structure, with the determined location based on the position information from the interrogated RFID.

10. The method of claim 8, wherein the positioning determining features are configured to provide a position of the autonomous transport vehicle upon an initialization of the autonomous transport vehicle.

11. The method of claim 8, wherein the controller ignores the output signal of the at least one sensor where the locations do not substantially coincide.

12. The method of claim 8, further comprising continuously updating an estimated location of the autonomous transport vehicle, with the controller, based on a last known verified location of the autonomous transport vehicle.

13. The method of claim 9, further comprising obtaining, with the controller, wheel encoder information from the autonomous transport vehicle for updating the estimated location of the autonomous transport vehicle.

14. The method of claim 8, further comprising:
   detecting, with the autonomous transport vehicle, case units located on the storage shelf; and
   determining, with the controller, a position of the autonomous transport vehicle based on the sensed case units.

15. A method comprising:
   providing an autonomous transport vehicle having a frame and drive section for autonomous traverse of at least one vertical lift having at least one shelf;
   providing a vehicle position determining system connected to the frame to interface a positioning system including positioning determining features having Radio Frequency Identifications (RFID(s)) disposed at predetermined locations on the at least one vertical lift and connected to at least one wall adjacent the at least one vertical lift, the being aligned with at least one predetermined storage position on the at least one shelf;
   interrogating, with at least one sensor of the vehicle position determining system that includes at least an antenna, the RFID(s) and obtaining position information based on the predetermined location of an interrogated RFID, and outputting a signal related to the position information from the interrogated RFID;
   aligning a payload of the autonomous transport vehicle with a predetermined storage position on a predetermined shelf of the at least one vertical lift based on a determined location of the autonomous transport vehicle; and
   determining, with a controller, based on the position information from the interrogated RFID, the determined location of the autonomous transport vehicle relative to the predetermined shelf within a storage structure of a storage and retrieval system based on at least the output signal from the at least one sensor.

16. The method of claim 15, further comprising is-verifying, with the controller, the location of the autonomous transport vehicle, within the storage structure, with the determined location based on the position information from the interrogated RFID.

17. The method of claim 15, wherein the positioning determining features are configured to provide a position of the autonomous transport vehicle upon an initialization of the autonomous transport vehicle.

18. The method of claim 15, wherein the at least one shelf includes at least two item holding locations, the method further comprising aligning a transfer arm of the autonomous transport vehicle with one of the at least two item holding locations based on the output signal from the at least one sensor.

19. The method of claim 15, further comprising ignoring the out signal from the at least one sensor where the locations do not substantially coincide.

20. The method of claim 16, further comprising continually updating an estimated location of the autonomous transport vehicle based on a last known verified location of the autonomous transport vehicle.

21. An autonomous transport vehicle for a storage and retrieval system having at least one vertical lift with at least one shelf, the autonomous transport vehicle comprising:
   a frame and a drive section for autonomous traverse of the at least one vertical lift;
   a vehicle position determining system connected to the frame so as to interface a positioning system including positioning determining features having at least one Radio Frequency Identification (RFID) disposed at predetermined locations on the at least one vertical lift and connected to at least one wall adjacent the at least one vertical lift, the being substantially aligned with at least one storage position on the at least one shelf, wherein:
      the vehicle position determining system includes at least one sensor that includes at least an antenna, for interrogating the at least one RFID and obtaining position information based on the predetermined location of an interrogated RFID and outputs a signal related to the position information from the interrogated RFID, where the autonomous transport vehicle is configured to align a payload of the autonomous transport vehicle with a predetermined storage position on a predetermined shelf of the at least one vertical lift based on a determined location of the autonomous transport vehicle; and
   a controller configured to:
      determine, based on the position information from the interrogated RFID, the determined location of the autonomous transport vehicle relative to the predetermined storage position on the predetermined shelf within a structure of the storage and retrieval system based on at least the output signal.

22. The autonomous transport vehicle of claim 21, wherein the controller is configured so as to verify the location of the autonomous transport vehicle, within the storage structure, with the determined location based on the position information from the interrogated RFID.

23. The autonomous transport vehicle of claim 21, wherein the positioning determining features are configured to provide a position of the autonomous transport vehicle upon an initialization of the autonomous transport vehicle.

24. The autonomous transport vehicle of claim 21, wherein the at least one shelf includes at least two item holding locations and the autonomous transport vehicle includes a transfer arm, the autonomous transport vehicle being configured to align the transfer arm with one of the at least two item holding locations based on the output signal from the at least one sensor.

* * * * *